US012717115B2

(12) United States Patent
Attar

(10) Patent No.: US 12,717,115 B2
(45) Date of Patent: Aug. 25, 2026

(54) IMAGING SYSTEM WITH MOVABLE NON-SYMMETRIC LENS

(71) Applicant: Glass Imaging Inc., Los Altos, CA (US)

(72) Inventor: Ziv Attar, Los Altos, CA (US)

(73) Assignee: Glass Imaging Inc., Los Altos, CA (US)

( * ) Notice: Subject to any disclaimer, the term of this patent is extended or adjusted under 35 U.S.C. 154(b) by 0 days.

(21) Appl. No.: 18/899,396

(22) Filed: Sep. 27, 2024

(65) Prior Publication Data

US 2025/0044548 A1 Feb. 6, 2025

Related U.S. Application Data

(63) Continuation of application No. PCT/US2023/017965, filed on Apr. 7, 2023.

(60) Provisional application No. 63/329,045, filed on Apr. 8, 2022.

(51) Int. Cl.

| | |
|---|---|
| ***G02B 7/34*** | (2021.01) |
| ***G02B 13/00*** | (2006.01) |
| ***G03B 13/32*** | (2021.01) |
| ***H04N 23/55*** | (2023.01) |

(52) U.S. Cl.

CPC ............ *G02B 7/34* (2013.01); *G02B 13/009* (2013.01); *G03B 13/32* (2013.01); *H04N 23/55* (2023.01)

(58) Field of Classification Search

CPC ...... G02B 13/001; G02B 13/009; G02B 7/34; G03B 13/32; G03B 3/02; G03B 30/00; G03B 5/00; H04N 23/54; H04N 23/55

See application file for complete search history.

(56) References Cited

U.S. PATENT DOCUMENTS

2009/0219624 A1 9/2009 Yamamoto et al.
2013/0010371 A1 1/2013 Otani et al.
2013/0342749 A1* 12/2013 Tashiro ................ G02B 13/009 359/689
2016/0363746 A1 12/2016 Minefuji
2017/0097492 A1* 4/2017 Hu ........................... G02B 7/04
(Continued)

FOREIGN PATENT DOCUMENTS

KR 10-1026327 B1 3/2011

OTHER PUBLICATIONS

PCT International Search Report and Written Opinion, PCT Application No. PCT/US2023/017965, Jul. 28, 2023, seven pages.

*Primary Examiner* — Amy R Hsu
(74) *Attorney, Agent, or Firm* — Fenwick & West LLP

(57) ABSTRACT

An imaging system includes an image sensor in an xy-plane, a lens module that directs light onto the image sensor, and a controller. The lens module includes a stationary group of optical lenses and a movable group of optical lenses. The stationary group includes a first set of non-symmetrical optical lenses, and the movable group includes a symmetrical optical lens and a second set of non-symmetrical optical lenses. The controller is configured to focus the imaging system over a focus range by generating an adjustment signal to move the movable group along an optical axis. The lens module focuses light on the image sensor along both the x- and y-axes of the image sensor and over the focus range, and the first and second sets of non-symmetrical optical lenses are positioned to have an astigmatism below a threshold value over the focus range.

20 Claims, 19 Drawing Sheets

(56) References Cited

U.S. PATENT DOCUMENTS

2019/0243111 A1* 8/2019 Ito ...................... G02B 15/1441
2021/0185197 A1* 6/2021 Attar ...................... H04N 23/11
2022/0244513 A1* 8/2022 Goto .................... G02B 13/009

* cited by examiner

Focused at distance x1:
Non-Symmetric Group
Symmetric group
Lens Module 507
Image Sensor 509
Lens Element 501

Focused at distance x2:
Non-Symmetric Group
Symmetric group
x
z

Focused at distance x1:
Non-Symmetric Group
Second Group
622
Lens Module
607
First Group
621
Third Group
623
Power Lens Element
602
Power Lens Element
601
Image Sensor
609

Focused at distance x2:
Non-Symmetric Group
First Group
621
x
z

Focused at distance x1:
Stationary Group
721
Movable Group
720
Lens Module
707
First Group
721
Power Lens Element
702
Power Lens Element
701
Image Sensor
709

Focused at distance x2:
First Group
721
x
z

Lens 901
Lens 902
Lens 903
Lens 904
Sensor 900

32.2
0
-32.2
-32.2
0
32.2
Y-Position (μm)
X-Position (μm)
0.969
0.872
0.775
0.678
0.581
0.484
0.388
0.291
0.194
0.097
0.000

IMAGING SYSTEM WITH MOVABLE NON-SYMMETRIC LENS

CROSS REFERENCE TO RELATED APPLICATIONS

This application is a continuation of PCT patent application No. PCT/US2023/017965 "Imaging System With Movable Non-Symmetric Lens" filed on Apr. 7, 2023, which claims the benefit of U.S. Provisional Application No. 63/329,045, "Imaging System with Non-Symmetric Lens Element," filed on Apr. 8, 2022, each of which is incorporated herein by reference in its entirety.

FIELD OF ART

The disclosure generally relates to the field of imaging systems and, in particular, to imaging systems with non-symmetric optical lenses.

BACKGROUND

A photographic camera includes a housing, a light sensitive surface, and a lens that images a scene on to the light sensitive surface. In the past, the light sensitive surface was a film. In modern devices, such as mobile devices and photographic cameras (e.g., single-lens reflex (SLR) cameras, drone cameras, video cameras), the film has been replaced by an image sensor that can translate the amount of light in small areas called pixels into electrical signals. Common image sensor devices are charge-coupled device (CCD) sensors and complementary metal-oxide-semiconductor (CMOS) sensors.

The size of a camera generally depends on the image sensor size, the lens size, and the housing size. The larger the image sensor is, the larger the lens becomes. The size of the lens depends also on the focal length of the lens which dictates the field of view of the camera. The lens design may also contribute to the size of the lens.

After many years of evolution and technology advancements in image sensors, lens design, lens manufacturing, and mechanical housing technology, cameras have converged to some dimensions which vary between applications. For example, camera systems in mobile devices may be a few millimeters in all 3 dimensions. This size may come from the desire for mobile devices to be small enough to fit into small spaces such as trouser pockets or small purses. As a result, in some cases the largest image sensor that may be used in such devices is limited to a few millimeters by a few millimeters. In some cases, the image sensor may be further limited by the size of the lens that forms an image on the image sensor. To compensate for these limitations, modern mobile devices may have more than one camera and the various cameras may be used to capture different fields of view and allow the users to perform actions such as zoom in while maintaining good image quality.

As stated previously, the size of an image sensor in a mobile device is limited. This consequently limits the image sensor's ability to collect a large amount of light while taking pictures. In addition to sensor size, the amount of light that can be captured by a sensor may depend on the lens aperture and the exposure time. Over the years the lens aperture, also known as F/#, has decreased thanks to better manufacturing capabilities and assembly technologies, but for mobile devices the lens aperture has reached a limit of around F/1.8 approximately. This limits image quality considerations, for example, when a field of view is moving or shaking. Specifically, exposure time may be limited by a user's ability to hold the camera still and the motion of objects in the scene. Optical image stabilization (OIS) methods may help increase this exposure time. However, these OIS methods are not capable of affecting the "blue effect" which originates from the motion of objects in the scene.

As a result of the above constrains, exposure time limitations have reached the limit and stand around 50 milliseconds for a wide-angle lens. This can be extended to 200-300 milliseconds using OIS methods, but, as previously stated, OIS methods cannot avoid blur caused by moving objects in the scene. In some cases, mobile device uses a bracketing scheme which captures short and long exposures and reduces motion blur in the long exposures using information from short exposures.

Thus, these limitations on exposure time, lens aperture, and image sensor size limit the amount of light that a camera can capture and therefor limits the image quality the camera can deliver in terms of noise, resolution, dynamic range, colors, and more.

SUMMARY

Some embodiments relate to an imaging system that includes an image sensor in an xy-plane, e.g., within a Cartesian coordinate system, a lens module that directs light onto the image sensor, and a controller. The lens module includes a stationary group of one or more optical lenses and a movable group of two or more optical lenses. The stationary group includes a first set of one or more non-symmetrical optical lenses, and the movable group includes at least symmetrical optical lens and a second set of one or more non-symmetrical optical lenses. The controller is configured to focus the imaging system over a focus range by generating an adjustment signal to move the movable group along an optical axis. The lens module focuses light on the image sensor along both the x- and y-axes of the image sensor and over the focus range, and the first and second sets of non-symmetrical optical lenses are positioned to have an astigmatism below a threshold value over the focus range. If some astigmatism is present at a focus position in the focus range, it may be an astigmatism that degrades the MTF (modulus transfer function) by no more than a factor of two (e.g., one and a half) compared to the focus position without an astigmatism. In some embodiments, the astigmatism in either dimension doesn't grow by a factor larger than two over the focusing range.

The combined optical power P of the first and second sets of non-symmetrical optical lenses along the x- or y-axis may have a positive value (e.g., the combined optical power P of the first and second sets of non-symmetrical optical lenses along the x- or y-axis is 10-50 diopters.). One of the sets of non-symmetrical optical lenses may have a combined optical power value that is negative along the x- or y-axis, and the other set of non-symmetrical optical lenses may have a combined optical power value that is positive along the x- or y-axis. In some embodiments, one of the sets of non-symmetrical optical lenses has a combined optical power value of $-nP$ and the other set of non-symmetrical optical lenses has a combined optical power value of $+(n+1)P$, where n is a real number greater than zero.

The lens module may have different magnifications along the x- and y-axes due to the first and second sets of non-symmetrical optical lenses. In some embodiments, the stationary group is configured to be stationary relative to the image sensor. The lens module may be configured to move the movable group along the z-axis. In some embodiments, the stationary group only includes the first non-symmetrical optical lens. In some embodiments, the stationary group doesn't include symmetrical optical lenses. The movable group may include one or more additional non-symmetrical optical lenses configured to correct for optical aberrations (e.g., chromatic, higher order, spherical, and coma aberrations)

The symmetrical optical lens may be closer to the image sensor along an optical axis than the first and second sets of non-symmetrical optical lenses. In some embodiments, the moveable group is closer to the image sensor along an optical axis than the stationary group. In some embodiments, a distance along an optical axis from the first set of non-symmetrical optical lenses to an aperture stop of the imaging system is less than half of a total length of the lens module along the optical axis.

In some embodiments, at least one of: the first set of non-symmetrical optical lenses includes two or more non-symmetrical optical lenses; or the second set of non-symmetrical optical lenses includes two or more non-symmetrical optical lenses.

The controller may be configured to generate the adjustment signal to move optical lenses of the movable group together. The controller may be configured to generate the adjustment signal move each optical lens of the movable group by substantially the same amount. In some embodiments, the controller is configured to generate the adjustment signal to move the symmetrical optical lens separately from the second set of non-symmetrical optical lenses.

In some embodiments, the lens module further includes a field lens coupled to the image sensor, the field lens introducing a non-symmetric distortion to light passing through the field lens. In some embodiments, the imaging system includes a non-symmetrical aperture with one larger axis and one smaller axis.

Some embodiments, relate to an imaging system that includes an image sensor and a lens module. The lens module is configured to direct light onto the image sensor, and the lens module has different magnifications along substantially orthogonal axes parallel to a sensing plane of the image sensor. The lens module includes: a first group of one or more optical lenses including a symmetrical optical lens; a second group of one or more optical lenses including a first non-symmetrical optical lens with a first optical power along a first axis parallel to the plane; and a third group of one or more optical lenses including a second non-symmetrical optical lens with a second optical power along the second axes parallel to the plane; The imaging system also includes controller configured to generate an adjustment signal to focus an image onto the plane of the image sensor by adjusting distances of the first group and the second group along an optical axis of the imaging system.

In some embodiments, the controller is configured to generate the adjustment signal to move the first group and the second group by substantially the same amount to focus the image onto the plane. In some embodiments, the controller is configured to generate the adjustment signal to move the first group and the second group by a substantially different amount to focus the image onto the plane.

Other aspects include components, devices, systems, improvements, methods, processes, applications, computer readable mediums, and other technologies related to any of the above.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1A:
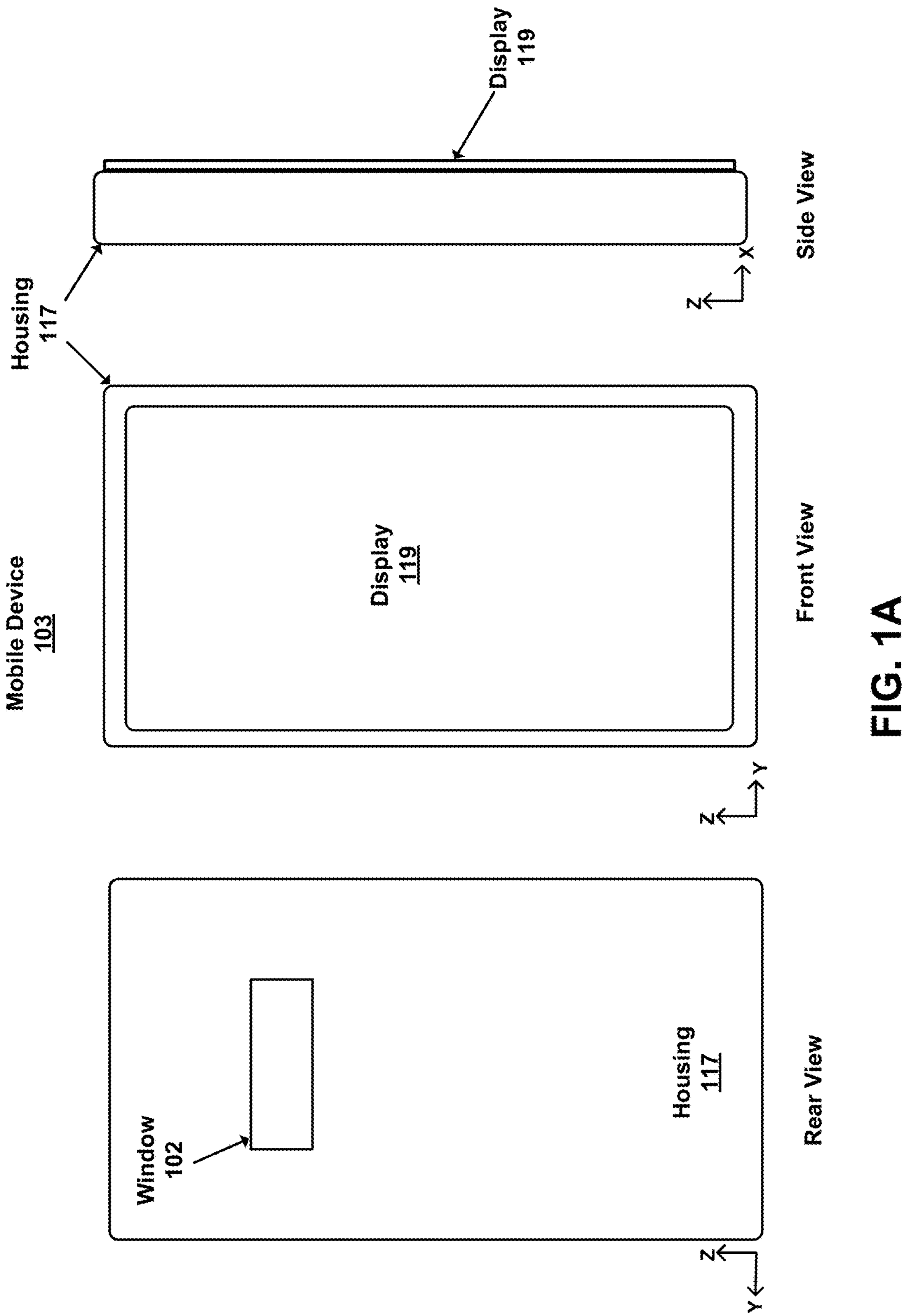
FIGS. 1A and 1B illustrate an imaging system contained in a mobile device, according to an embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Some embodiments relate to an imaging system with a lens module that focuses light onto an image sensor (e.g., with a large aspect ratio, such as 17:9). The lens module may have different magnifications in orthogonal axes parallel to the sensing plane of the image sensor (referred to as the x- and y-axes). The lens module may include at least a first group of optical lenses and a second group of optical lenses. The first group includes a non-symmetrical optical lens and may be stationary relative to the image sensor. The second group may include a non-symmetrical optical lens and one or more symmetrical optical lenses. The second group may be moved relative to the image sensor (e.g., along an axis perpendicular to the sensing plane of the image sensor) to adjust the focus of the lens module. The optical power of the non-symmetrical optical lens in each group is configured such that light is focused on the image sensor along both x- and y-axes for any focus position of the second group.

Some embodiments relate to an imaging system with a lens module that focuses light onto an image sensor (e.g., with a large aspect ratio, such as 17:9). The lens module may include a non-symmetrical optical lens coupled to the image sensor (or close to the image sensor) that introduces a non-symmetrical distortion to light passing through. For example, the optical lens distorts the focused image along at least one axis parallel to the sensing plane of the image sensor. This optical lens may be referred to as a field lens. The distortion may increase with distance from the center of the field lens. For example, the field lens includes a center portion with the same or similar focal lengths along the x- and y-axes, and an outer potion surrounding the center portion with different focal lengths along the x- and y-axes. The distortion allows the imaging system to capture a larger field of view in the direction along the axis. Thus, for example, the imaging system allows an image sensor with an aspect ratio of 4:2 to capture a scene with an aspect ratio of 4:3.

Imaging System

Figure 1B:
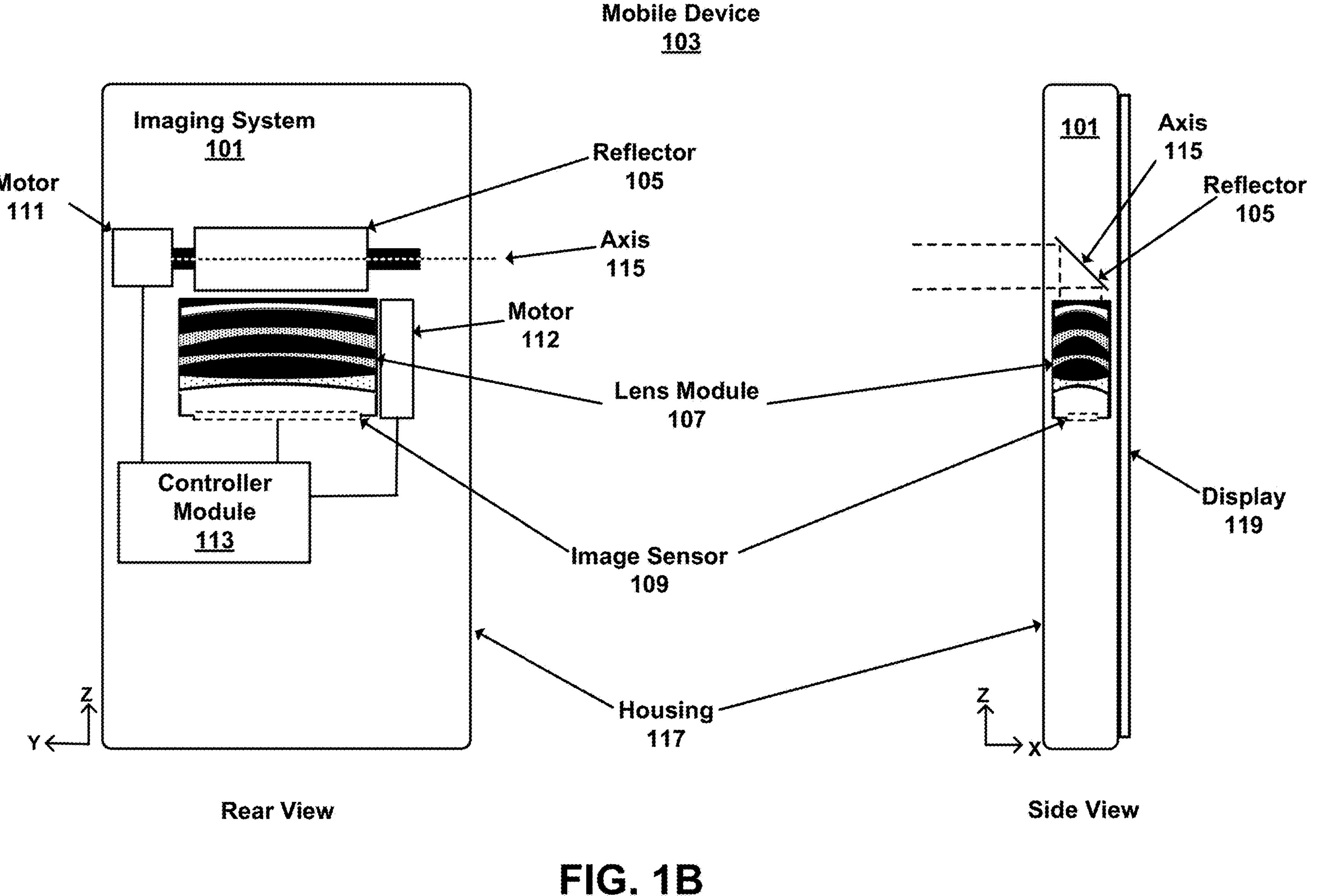

FIGS. 1A-1B illustrate an example imaging system 101 contained in an example mobile device 103, according to an embodiment. Specifically, FIG. 1A illustrates a front, rear, and side view of the mobile device 103, and FIG. 1B illustrates a cross-sectional rear view and cross-sectional side view of the mobile device 103. The mobile device 103 includes the imaging system 101, a housing 117 with a window 102, and a display 119. The imaging system 101 includes a rotatable reflector 105, a motor 111, a motor 112, a lens module 107 (also referred to as a lens design), an image sensor 109, and a controller module 113.

The reflector 105 directs light passing through the window 102 downward towards the lens module 107. The lens module 107 focuses light onto the image sensor 109. The motor 111 rotates the reflector 105 about axis 115, which is substantially parallel (e.g., within a degree or two) to the image sensor plane. Rotating the reflector 105 allows the reflector 105 to direct light from different portions of the external environment towards the image sensor 109. The controller 113 is electrically coupled to the image sensor 109 and the motor 111. To form an image of the external environment, the imaging system 101 captures images of portions of a view of the external environment while rotating the reflector 105. The rotation of the reflector 105 from an initial angular position to a final angular position may be referred to as a scan. The sequence of captured images contains information of several adjacent portions of the environment and, after combining (e.g., stitching or fusing) the images together, the imaging system 101 forms a larger image of the external environment with a predetermined aspect ratio.

The housing 117 contains one or more of the components of the imaging system 101. Locations and orientations of the imaging system components may be described relative to the housing 117 and a housing window 102. For example, the housing 117 is defined by multiple walls that contain the imaging system 101, and one of the walls includes a housing window 102 with a plane, for example, defined by a boundary of the window 102. The plane may be parallel to an yz- (or yz-) plane in a three-dimensional reference system. The housing 117 may have a low profile along an axis perpendicular to the plane of the window 102 (e.g., along the x-axis). The length of the housing along the x-axis may be referred to as the thickness of the housing 117 and may range from, for example, 5 to 15 millimeters. In embodiments where the housing 117 is part of a mobile device 103, the window plane may be parallel to a display 119 of the mobile device 103. Unlike conventional imaging systems, the image sensor surface does not face the window plane. For example, the image sensor surface is perpendicular to the window plane (e.g., parallel to the xy-plane) and is outside the boundary of the window 102. Due to this, the reflector 105 may be aligned with the window 102 to direct light propagating through the window 102 to the image sensor plane. The lens module 107 may be between the reflector 105 and the image sensor 109. An aperture plane may be between the reflector 105 and the lens module 107 and may be perpendicular to the window plane and parallel to the image sensor plane. The reflector allows the optical path of the imaging system 101 to be folded into the yz-plane. This folding allows the optical path to increase beyond the limit of the housing's thickness and into the housing's width (e.g., length along the y-axis) and height (e.g., length along the z-axis), which are typically larger than its thickness. Thus, the reflector, the image sensor, and/or an aperture of the lens module 107 may have aspect ratios that are not 1:1, and their long axes may be parallel to each other.

The terms "parallel" and "perpendicular" as used herein may refer to components being substantially parallel or substantially perpendicular (e.g., within two degrees) since manufacturing components that are perfectly parallel or perpendicular may be practically difficult to achieve.

The image sensor 109 is an imaging device that captures images of portions of the external environment. Examples of the image sensor 109 include a CCD sensor and a CMOS sensor. As illustrated in FIG. 1, the image sensor surface may lie in the xy-plane relative to an xy-plane of the mobile device 103 and the image sensor surface faces in a perpendicular direction (along the z-axis) from the xy-planar surface. Due to this positioning, the sensor plane of the image sensor 109 does not face the view of the external environment. By placing the image sensor 109 in the xy-plane, the size of the image sensor 109 can be larger than image sensors in conventional cameras. The smaller dimension of the image sensor plane (along the x-axis) may be limited by the mobile device thickness while the longer dimension (along the y-axis) may be limited by the mobile device width, which may be many centimeters long. This allows the image sensor 109 to have a high aspect ratio, such as ratio greater than 17:9 (e.g., 1:10). Conventional cameras produce image of scenes with aspects ratios that are not as high (e.g., sensors that are limited to 2:3, 3:4, or 16:9). Due to the high aspect ratio of the image sensor 109, the image sensor 109 may create narrow images ("image strips") that correspond to a narrow view of the scene. For conventional imaging systems in mobile devices, the size of the image sensor may be limited by the focal length of the camera lens. However, by changing the location and orientation of the image sensor 109 as described herein, the image sensor size may be larger than image sensors in conventional imaging systems with a same or similar housing.

As described above, the reflector 105 (also referred to as a scanning mirror) is an optical component that rotates about axis 115 to direct light to the image sensor 109. Generally, axis 115 is substantially parallel to a long dimension of the image sensor plane and the reflector 105 is centered on window 102. If the plane of the window 102 (e.g., the yz-plane) is perpendicular to the plane of the image sensor 109 (e.g., the xy-plane), the reflector 105 may direct light at around a 45-degree position relative to the image sensor plane to direct light towards the image sensor 109. Due to the high aspect ratio of the image sensor 109, the reflector 105 may also have a high aspect ratio to ensure light is reflected to the entire surface of the image sensor 109. The reflector 105 is illustrated in FIG. 1B as having a rectangular plane, however other shapes are possible, such as concave or convex shapes (e.g., which may be used to expand or shrink the field of view).

The reflector 105 is described herein in terms of 'directing' light, however this is for ease of description. The reflector 105 may optically direct, widen, slim, reflect, diffract, refract, disperse, amplify, reduce, combine, separate, polarize, or otherwise change properties of the light as it propagates in the imaging system 101. To do this, the reflector 105 may include reflective coatings, metalized features, optical gratings, mirrors, prismatic structures, Fresnel structures, corner reflectors, retroreflectors, and the like on one or more of its surfaces.

The lens module 107 includes one or more optical components and is designed to form an image on the image sensor 109. The lens module 107 may spread, focus, redirect, and otherwise modify the light passing through it. The lens module 107 may be as simple as a single lens or it may include additional optical components, such as diffusers, phase screens, beam expanders, mirrors, and lenses (e.g., anamorphic lenses). In some embodiments, the entrance pupil of the lens module 107 is adjacent to the reflector 105. This may allow the reflector 105 to have a smaller size. In some embodiments, the lens module 107 include a non-symmetrical aperture with one large and one small axis (stretching an axis may be used in devices that have dimension constrains, like smartphones, and in those cases the aperture can be much larger if it isn't symmetrical).

Because of the high aspect ratio of the image sensor 109, the lens module 107 may be designed and manufactured to be non-circular or non-symmetric and follow the dimension of the image sensor 109 in the terms of its aperture. Using a lens module 107 with a non-symmetrical aperture may allow it to fit in the mobile device housing 117. Furthermore, the focal length of the lens module 107 may be different in the x- and y-directions. In some embodiments, this results in the imaging system 101 not preserving the aspect ratio, so, for example, a 4:3 scene may be imaged by an image sensor that is 8:3. One or more of the optical components of the lens module 107 may have surfaces with cylindrical symmetry but the apertures of other components may be rectangular or another elongated shape. The lens module 107 may be manufactured using wafer level technology, which may be beneficial in creating rectangular shaped optical components by dicing lens surfaces in the desired aspect ratio. In some embodiments, the lens module 107 is manufactured using injection molding technology by creating molds that have non-symmetrical apertures. The components of the lens module 107 may be glass or plastic injection molded or machined (e.g., via wafer level technology). Example lens modules are further described with reference to FIGS. 3-11.

The motor 112 is controlled by controller 113 and is configured to move the lens module or one or more optical components of the lens module 107. For example, the motor 112 moves one or more optical lenses along the optical axis to focus light onto the sensing plane of the image sensor 109. The imaging system may include multiple motors 112, for example, if multiple optical components should be moved separately or by different amounts. The motor 112 may include one or more actuator type mechanisms, galvanometer type mechanisms, mems type mechanisms, motorized type mechanisms, or stepper motor type mechanisms. The motor 112 may also be referred to as a lens shift mechanism.

As stated above, the motor 111 rotates the reflector 105 around axis 115. To do this, the motor 111 may include one or more actuator type mechanisms, galvanometer type mechanisms, mems type mechanisms, motorized type mechanisms, or stepper motor type mechanisms. In some embodiments, as further described below, the motor 111 can move the reflector 105 in other directions. For example, the motor 111 can translationally and/or rotationally move the reflector 105 along the x, y, and/or z-axes.

In some embodiments, motor 111 tilts the reflector 105 (e.g., by a few degrees in either direction) to compensate for motion (e.g., hand motion) while the image sensor 109 is capturing an image of a portion of the scene. For example, if a user tilts the mobile device 103 slightly downward, the motor may tilt the reflector 105 upward to compensate for the motion so that the image sensor 109 receives a same portion of the scene despite the tilting. In some embodiments, the imaging system 101 includes a sensor shift mechanism (e.g., another motor) to shift the image sensor 109 in one or more directions (e.g., in the xy-plane) to compensate for this motion. In some embodiments, the imaging system 101 includes motor 112 to shift the lens module 107 (or a component of it) in one or more directions (e.g., in the xy-plane) to compensate for this motion. If the imaging system 101 includes multiple motion compensating mechanisms, the controller 113 may coordinate the multiple mechanisms to work in conjunction to offset motion. For example, the motor 111 tilts the reflector 105 to compensate for motion in one direction and a sensor shift mechanism or a lens shift mechanism (e.g., 112) compensates for motion in another direction. In some embodiments, the reflector 105 rotates about multiple substantially perpendicular axes (e.g., the x-axis and z-axis) to compensate for motion (e.g., instead of a sensor or lens shift mechanism).

The motor 111 and shift mechanisms (e.g., 112) may also act as auto focusing mechanisms. For example, a lens shift mechanism shifts the lens module 107 (or a component of it) closer to or farther away from the image sensor 109 (e.g., along the z-axis) to achieve the desired focus. In another example, a sensor shift mechanism shifts the image sensor 109 closer to or farther away from the lens module 107 (e.g., along the z-axis) to achieve the desired focus.

The controller module 113 may constitute software (e.g., program code embodied on a machine-readable medium and executable by a processing system to have the processing system operate in a specific manner) and/or hardware to provide control signals (also referred to as adjustment signals) to the motor 111, motor 112, image sensor 109, or some combination thereof. Thus, the controller 113 may: (1) rotate the reflector 105 via motor 111 to direct light from different portions of the external environment towards the image sensor 109, (2) focus light on the image sensor 109 by adjusting optical components of the lens module 107 via motor 112, (3) synchronize the image sensor 109 with the reflector 105 to capture images of the different portions of the environment, or (4) some combination thereof. Additionally, the controller 113 may receive the captured images and combine them to form a lager continuous image of the external environment.

In some embodiments, the imaging system 101 includes one or more motion sensors (e.g., accelerometers, gyroscopes, etc.) to track motion of the imaging system relative to the external environment. The controller module 113 may receive motion data from the motion sensors. If the determined motion is above a threshold amount, the module 113 may provide instructions to the motor 111 and/or a sensor shift mechanism to compensate for the motion.

In some embodiments, the imaging system 101 is not contained in the mobile device 103. For example, the imaging system 101 is contained in a standalone device, such as a case for the mobile phone 103.

Figure 2A:
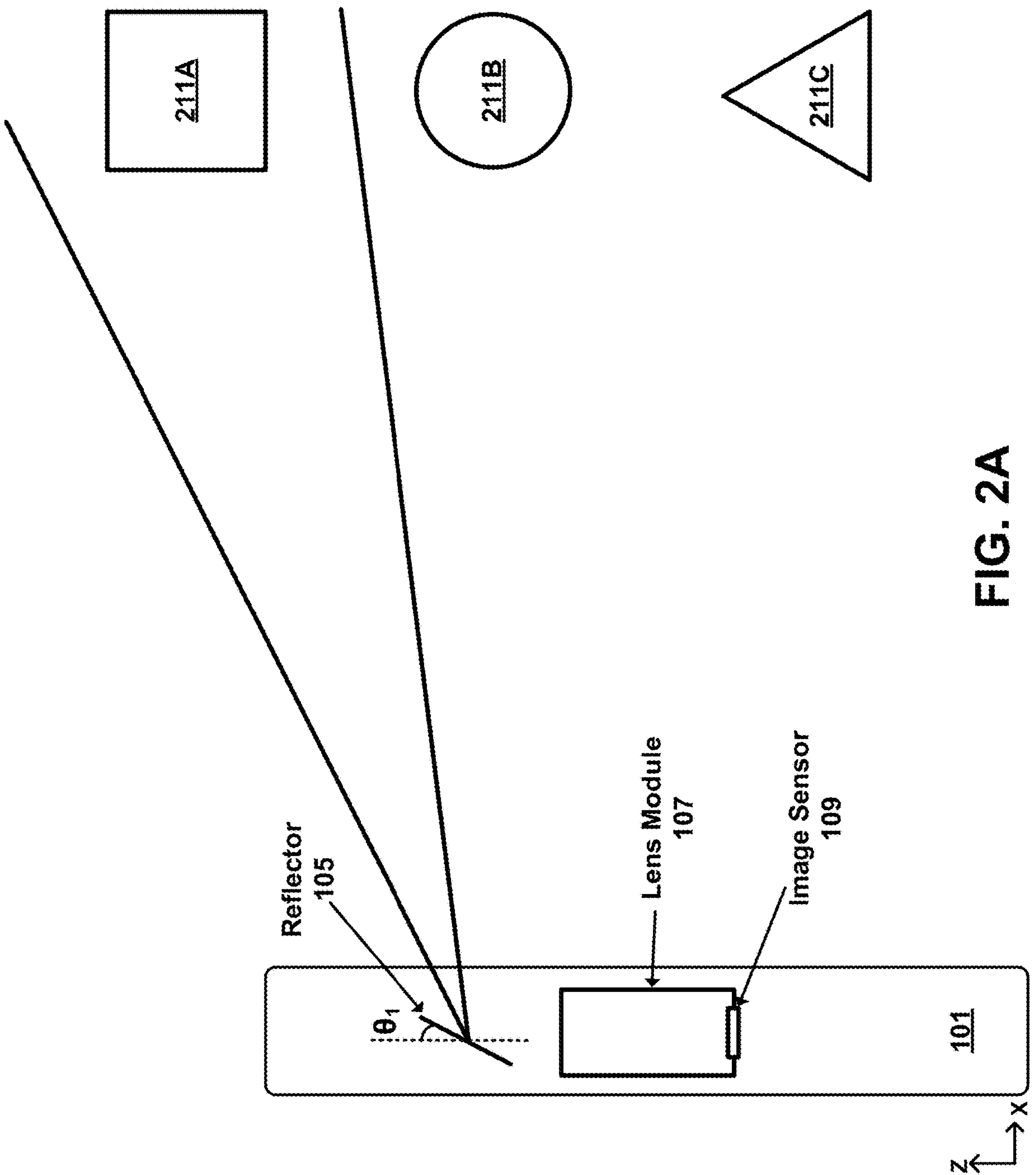
FIGS. 2A-2C illustrate the imaging system capturing images of different portions of a view of an external environment, according to an embodiment.
Figure 2B:
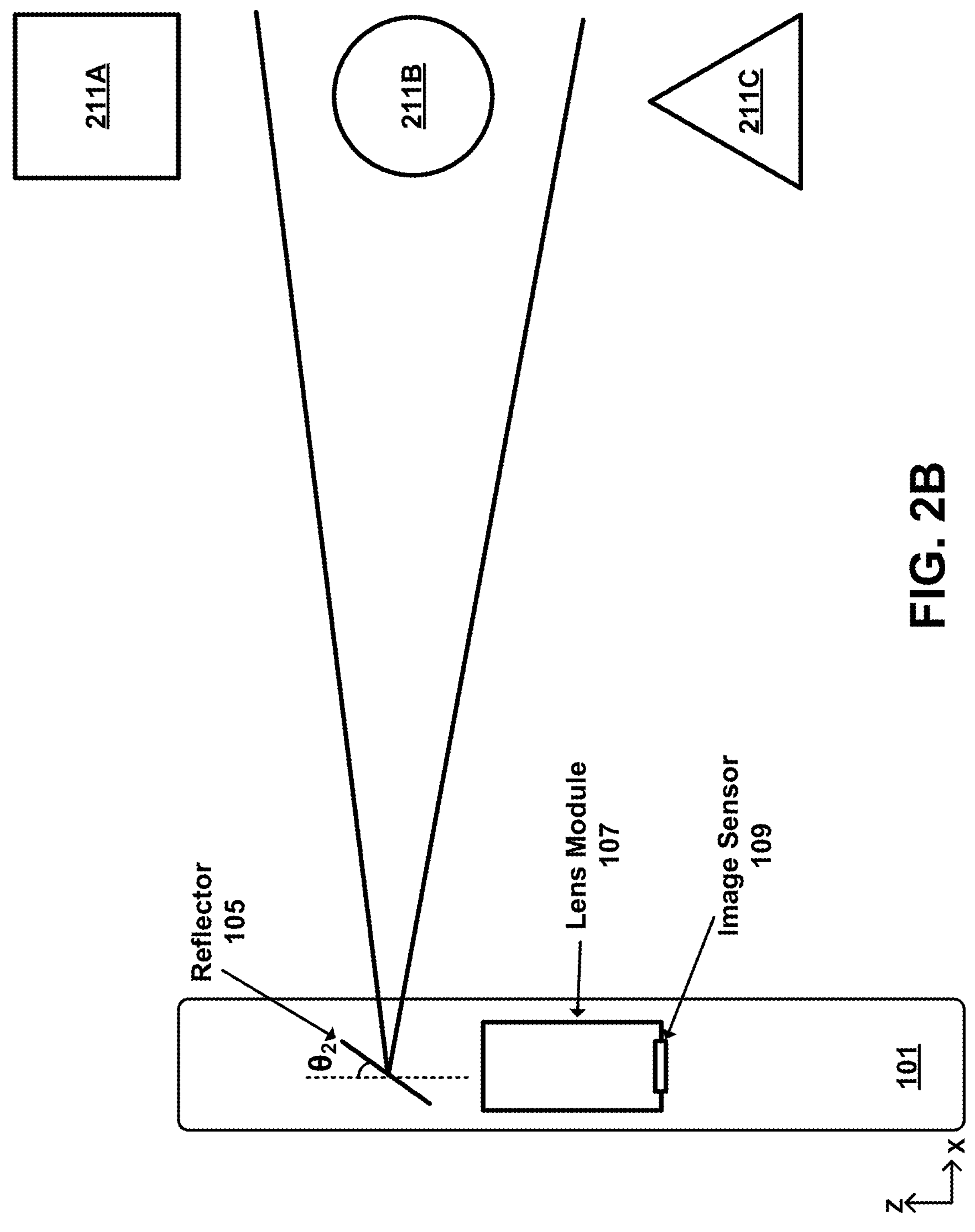
Figure 2C:
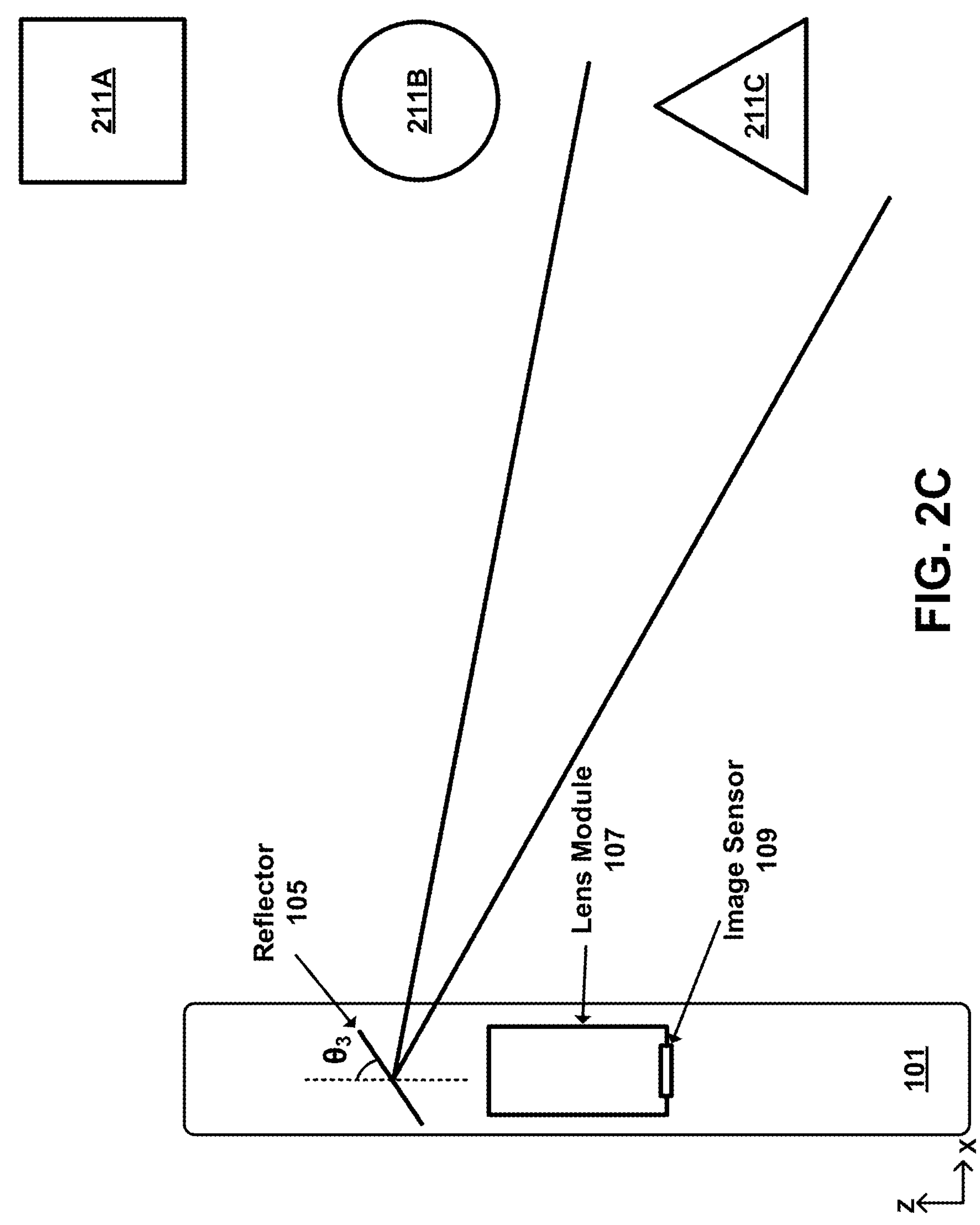

FIGS. 2A-2C illustrate the imaging system 101 capturing images of different portions of a view of an external environment, according to an embodiment. In the example of FIGS. 2A-2C, the external environment includes one or more objects within a field of view. In this example, for ease of discussion, the objects are a cube 211A, a sphere 211B, and a pyramid 211C that are vertically aligned. In FIG. 2A, the reflector 105 is tilted at a first rotational position (e.g., it forms angle $\theta_1$ relative to the yz-plane) to direct light from the top portion of the external environment towards the image sensor 109. Thus, the image sensor 109 captures an image of the cube 211A. In FIG. 2B, the reflector is tilted at a second rotational position (e.g., it forms angle $\theta_2>\theta_1$ relative to the yz-plane) to direct light from the middle portion of the external environment toward the image sensor 109. Thus, the image sensor 109 captures an image of the sphere 211B. In FIG. 2C, the reflector is tilted at a third rotational position (e.g., it forms angle $\theta_3>\theta_2$ relative to the yz-plane) to direct light from the bottom portion of the external environment toward the image sensor 109. Thus, the image sensor 109 captures an image of the pyramid 211C. In some example embodiments, to capture a set of images, the reflector angles θ may range symmetrically around the 45 degree position (e.g., from 25-65 degrees) relative to the xy-plane.

Figure 2D:
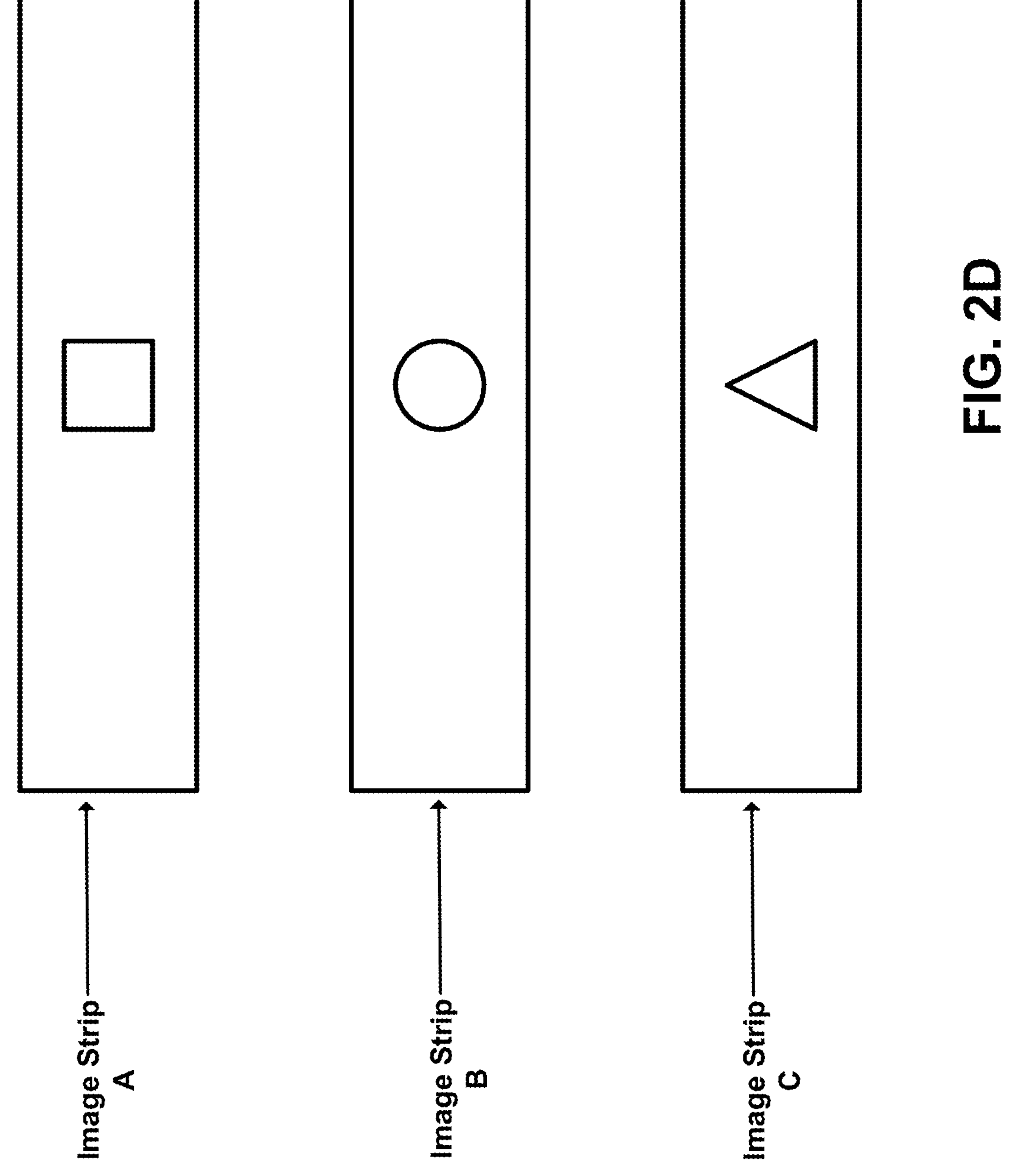
FIG. 2D illustrates the images of the portions of the view, according to an embodiment.

FIG. 2D illustrates three image strips that were captured by the image sensor 109, according to an embodiment. Each image strip is an image of a different portion of the external environment due to each strip being captured while the reflector 105 was in a different rotational position. The image strips have high aspect ratios due to the high aspect ratio of the reflector 105, lens module 107, and image sensor 109. Image strip A is an image of the cube 211A and was captured by the image system 101 in FIG. 2A. Image strip B is an image of the sphere 211B and was captured by the image system 101 in FIG. 2B. Image strip C is an image of the pyramid 211C and was captured by the image system 101 in FIG. 2C.

The exposure time to capture each image strip may be limited by user motion (the user unintentionally moving the device 103 as they hold it) and by objects moving in the scene. Additionally, the total exposure time of the image strips may be limited by possible changes in the external environment between the capturing of image strips. The image strip exposure times and the total exposure time may be limited to predetermined threshold times or determined dynamically (e.g., based on an amount of movement of the mobile device 103).

Figure 2E:
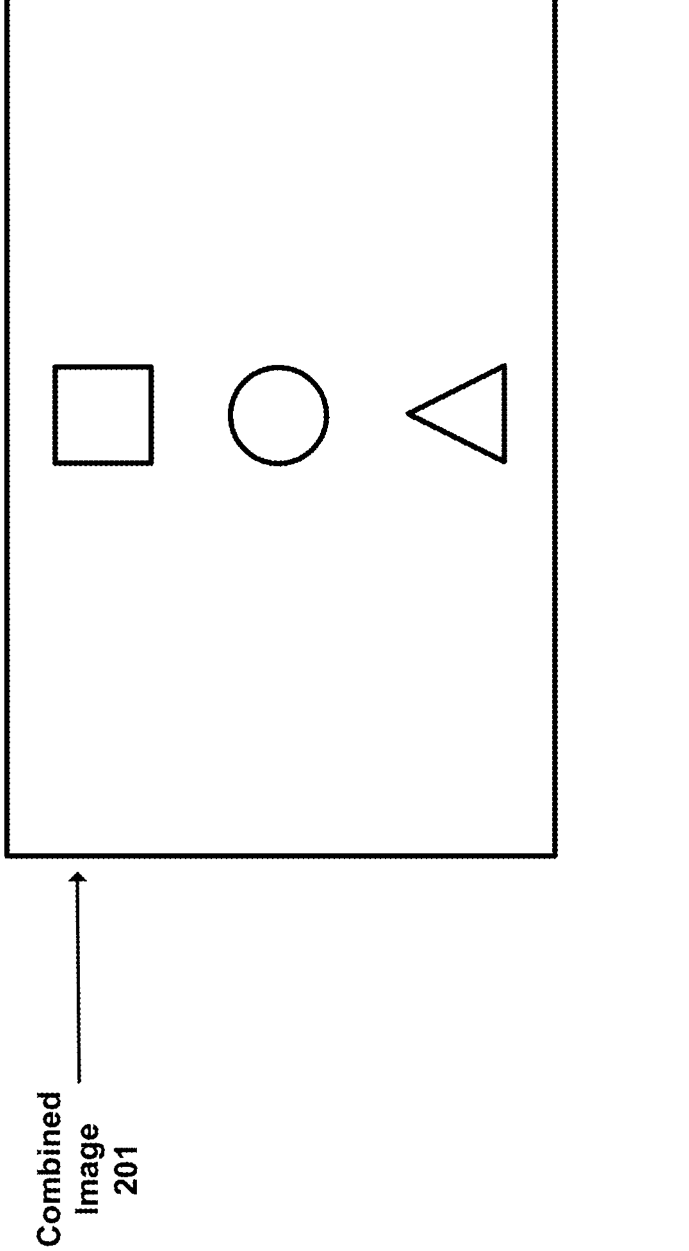
FIG. 2E illustrates an image of the view of the external environment formed from the images in FIG. 2D, according to an embodiment.

FIG. 2E illustrates an image 201 of a view of the external environment, according to an embodiment. The image 201 is formed by combining (e.g., fusing or stitching) image strips A-C illustrated in FIG. 2D. The combined image 201 may be referred to as a composite image. The horizontal field of view of the combined image 201 may be based on the width (along the y-axis) of the window 102, reflector 105, lens module 107 (e.g., its aperture), and/or image sensor 109, and the vertical field of view of the combined image 201 may be based on the scanning range of the reflector 105. Typically, the vertical field of view is larger than the horizontal field of view.

Depending on the position of the reflector 105 when image strips are captured, the image strips may have some overlap with each other (e.g., 10-300 rows of pixels). Capturing image strips with overlap may help ensure that the image strips are not missing portions of a view of the environment (e.g., so that the entire view is captured) and may reduce the noise value of the combined image 201. Capturing image strips with overlap may also assist the combination process to ensure the image strips are combined properly. For example, the controller 113 uses overlapping portions to align the image strips during the combination process. In another example, if objects in the environment move between the capturing of image strips or if the mobile device 103 moves between the capturing of image strips, the control system 101 may use the overlapping portions to correct for artifacts caused by this movement.

Rotating the Reflector

The rotation of the reflector 105 may be discrete such that it rotates from an initial (e.g., maximal) angular position of the reflector 105 to the final (e.g., minimal) angular position with N stops, where N is the number of image strips which will form a combined image. N may be as small as two. N may depend on the desired exposure time of the combined image and/or the size of the smaller dimension of the image sensor 109 and the desired size or aspect ratio of the combined image. For example, if the image sensor has 24,000 pixels by 6,000 pixels and if the final combined image is to have a 4:3 aspect ratio, then the reflector 105 will have three discrete positions and the combined image will be 24,000 pixels by 18,000 pixels. The previous scanning example did not include any overlap in the image strips. If N is increased, then some areas in the scene will appear more than once in the image strips. For example, if the scanning is done using six discrete angular positions, then each point in the scene will appear in two image strips.

The imaging system 101 may be capable of capturing videos. In these cases, combined images may form frames of the video. If the video frame rate or preview frame rate is, for example, 25 FPS (frames per second) the total exposure time for each combined image is 40 milliseconds or less. In the case of a three discrete position scanning, each position may be exposed for 13.33 milliseconds. However, the reflector 105 needs time to change its position and to come to a stop, which means the exposure time may be around 10 milliseconds for each image strip.

For still image capture it is possible to interrupt an image preview displayed to the user when the user presses the capture button and allow longer exposure than the one limited by the image preview speed.

The above considerations considered a full field of view. If the imaging system 101 captures a narrower field of view, it may reduce the scanning range of the reflector 105. For example, if a user zooms in by a factor of three (i.e., 3× zoom), the imaging system 101 may not perform any scanning. Accordingly, the reflector 105 may be stationary. For example, if the image sensor 109 has 24,000 pixels by 6,000 pixels and the final image has a height of 6,000 pixels and an aspect ratio of 4:3, the reflector 105 may not rotate and the other dimension of the image may be 8,000 pixels (e.g., read out and cropped from the 24,000 pixel dimension of the image sensor 109).

In some embodiments, the rotation of the reflector 105 is continuous instead of discrete. In a continuous scanning mode, the reflector 105 continuously rotates at a speed that is slow enough that the captured images are not blurry, yet fast enough to finish scanning a desired field of view at desired frame rate (e.g., 40 milliseconds). In a continuous mode, the rotation rate of the reflector 105 may be dictated by a desired frame rate. For example, if a frame rate is 30 FPS (33 milliseconds between frames), the scene scanning takes around 25 milliseconds and then the reflector 105 is rotated back to its initial position. Other example values are possible, such as 30 milliseconds, depending on the how fast the reflector can be rotated back to its initial position. In embodiments where the reflector 105 is two sided, the reflector 105 may not need to be rotated back to its initial position.

In a continuous scanning mode, points in the external environment may appear on every line of pixels during a scan. The image sensor 109 may capture enough images so that a point is captured by each row of pixels for consecutive image strips. For example, if the image sensor 109 includes 6000 rows of pixels, it may capture 6000 images during a single scan. To do this, for example, an image sensor may, instead of integrating charge on one pixel for a certain number of milliseconds, integrate charge from changing pixels. If this change (scan) is synchronized with the reflector rotational speed, then the output can correspond to one point in space. An example implementation of this with an image sensor 109 is reading out just one pixel row, which can happen very quickly. So, for example, a sensor that does 30 FPS (frames per second) and has 6000 rows can perform 15000 FPS with reading out just one row. Alternative to capturing enough images so that a point is captured by each row of pixels, the image sensor 109 may capture a predetermined number of images during a scan that is less than the number of pixel rows.

Lens Module With Different Magnifications Along Axes

In some example embodiments, a desired output aspect ratio of an image strip is different than an aspect ratio of the image sensor 109. For example, the imaging system 101 images a scene with an aspect ratio of 4:3 or 16:9 (or other desired ratio) onto an image sensor 109 with a much higher aspect ratio, such as 5:1 or 10:1. More generally, the lens module 107 may have different magnifications or distortions along different axes (e.g. the x- and y-axes) in imaging a (e.g., rectangular) field of view with an aspect ratio of 1:n on an image sensor with an aspect ratio of 1:m, where m is larger than n. For example, the lens design focuses a scene with an aspect ratio of 4:3 onto an image sensor with an aspect ratio of 4:2. To have different magnifications or distortions along different axes (e.g., x- and y-axes), the lens module may include one or more non-symmetrical optical lenses (if the lens module only includes a single non-symmetrical optical lens, that optical lens may have two surfaces that are non-symmetrical). Note that a lens module with the same magnifications or distortions along different axes (e.g., the x- and y-axes) may have non-symmetrical optical lenses as well.

To do so, the lens module 107 may have different focal lengths along the x- and y-axes (z is the optical axis). Achieving different focal lengths may be done by using non-symmetrical optical lenses, such as freeform optical elements (also known as anamorphic lenses) or cylindrical optical elements which have optical power only in one direction. As a result of using such a lens module 107, each pixel on the sensor (assuming it is a symmetrical pixel (e.g., square shape)) may collect photons from a rectangular area in the scene.

To achieve similar resolution in the x- and y-directions, it may be advantageous for the image sensor 109 to have non-symmetrical pixels (e.g., rectangular pixels). Another option is to apply analog or digital binning (e.g., by the controller module 113) in the longer dimension (e.g., along the y-direction) of the image sensor 109 to reduce the resolution in that dimension to a resolution that corresponds to the desired output aspect ratio.

Figure 3:
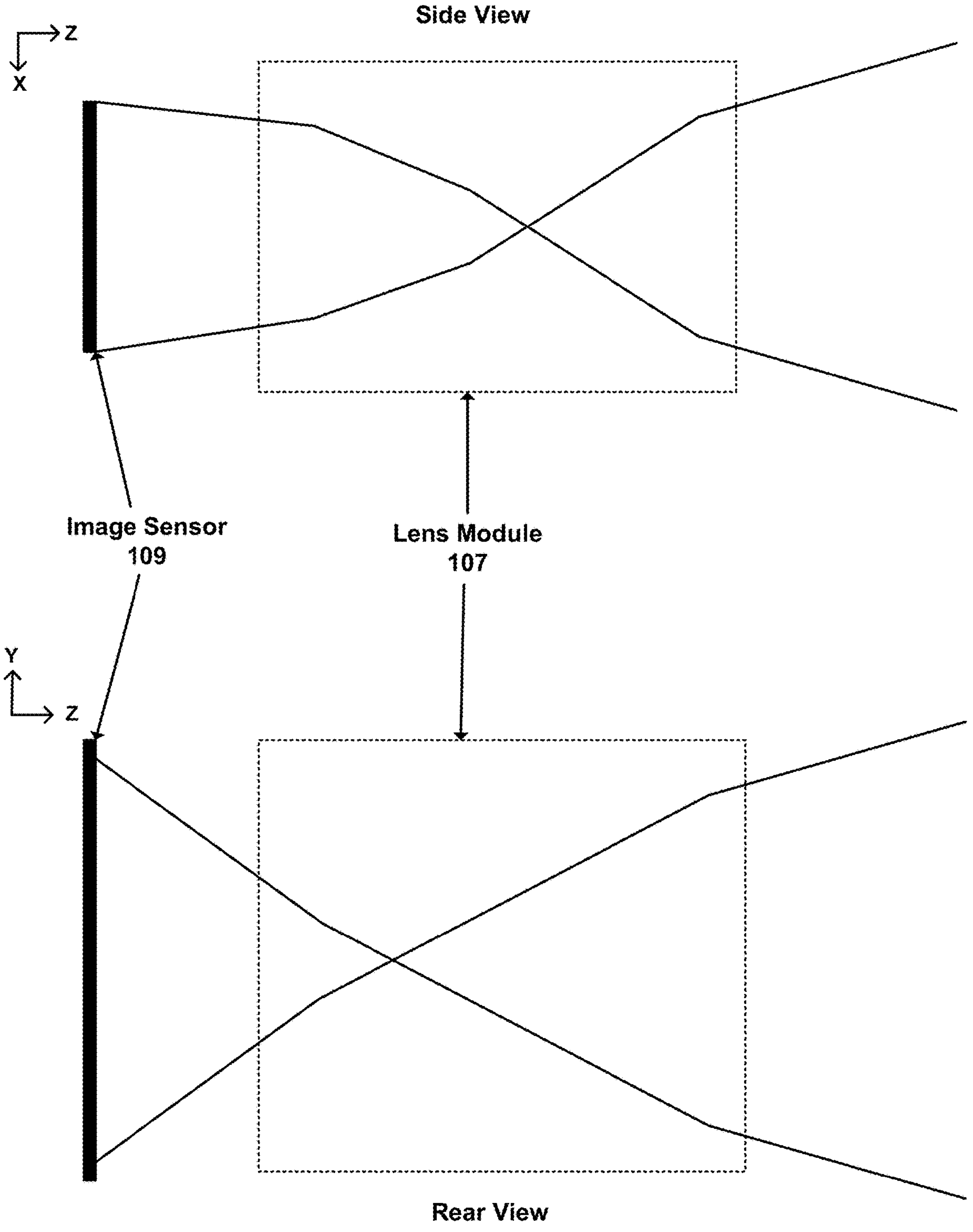
FIG. 3 illustrates views of a lens module with different magnifications along the x- and y-axes, according to an embodiment.

FIG. 3 shows a side view and a rear view of an example lens module 107 with different magnifications along the x- and y-axes, according to an embodiment (the individual optical lenses are not illustrated). The image sensor 109 has a high aspect ratio, which can be seen by comparing its length along the x- and y-axes. The lens module 107, has a shorter focal length in the xz-plane and a longer focal length in the yz-plane. To do this, the lens module 107 in FIG. 3 has one or more non-symmetrical optical lenses to ensure that the lens module 107 can focus an image onto the plane of the image sensor 109.

To design a lens module 107 with different focal lengths in the two dimensions perpendicular to the optical axis, at least two of the optical lens surfaces may be non-symmetric. Using only one non-symmetrical surface may result in a different focal length but may also result in a different focus plane, which may make it difficult or impossible to capture an image using a single image sensor 109. Thus, in these embodiments, the lens module 107 may have an optical design with at least two non-symmetrical surfaces (e.g., a single lens with non-symmetrical front and back surfaces or multiple non-symmetrical lenses). Having two non-symmetrical surfaces may provide different magnifications along the two dimensions and both dimensions being focused on the same plane.

As used herein, a non-symmetric optical lens refers to an optical lens with a surface that that focuses or diverges light along an axis (e.g., the x-axis) differently than another axis (e.g., the y-axis). For example, a non-symmetrical optical lens may have an optical power of $P_x>0$ along the x-axis and an optical power of $P_y$=0 along the y-axis. To have different optical powers along different axes, a non-symmetrical optical lens may have a surface that is non-symmetrical in shape (e.g., within manufacturing standards or capabilities). For example, a non-symmetric optical lens has a surface with a radius of curvature that is not constant or is different in the x- and y-directions. In some embodiments, non-symmetry refers to non-symmetry about the optical axis of the optical lens. Example non-symmetrical optical lenses include cylindrical and anamorphic lenses.

As used herein, a symmetric optical lens refers to an optical lens with two or more surfaces that focus or diverge light along an axis (e.g., the x-axis) the same as another axis (e.g., the y-axis) (e.g., within manufacturing standards or capabilities). For example, a symmetrical optical lens has substantially the same optical power along both the x- and y-axes (e.g., less than 1% or 0.1% difference). To have the same optical powers along different axes, a symmetrical optical lens may have two or more optical surfaces that are symmetrical (e.g., within manufacturing standards or capabilities). For example, a symmetric surface has a constant radius of curvature. In some embodiments, symmetrical refers to symmetry about the optical axis of the optical lens. Example symmetrical optical lenses include convex and concave lenses.

Figure 4:
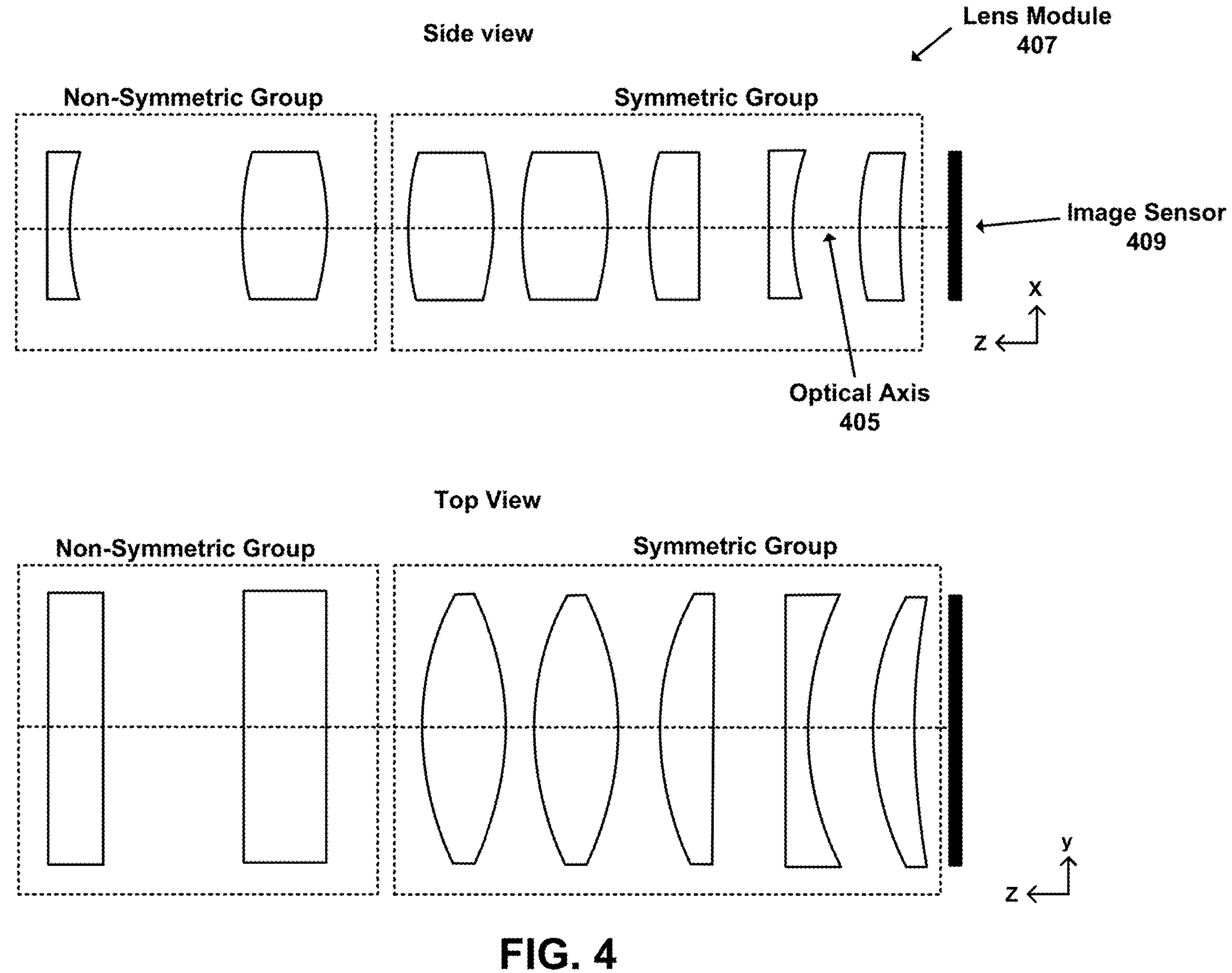
FIG. 4 is a cross sectional view of an example lens module with a group of symmetrical lens elements and another group of non-symmetrical lens elements, according to an embodiment.

An example lens module 107 with symmetrical and non-symmetrical optical lenses is illustrated in FIG. 4. The example lens module 107 in FIG. 4 includes a group of symmetric optical lenses ("symmetric group") and a group of non-symmetric optical lenses ("non-symmetric group") along optical axis 405. By comparing the side view and the top view, the non-symmetrical surfaces of the optical lenses in the non-symmetric group can be identified. In the example of FIG. 4, the symmetric group includes five optical lenses, and the non-symmetric group includes two cylindrical lenses, however each group can include more or less optical lenses (e.g., just one).

In general, a lens module may be designed so that two axes (e.g., the x- and y-axes) both focus on the same plane for an object at a certain distance from the imaging system. For focusing the lens module to other distances, a group of one or more symmetrical optical lenses of the lens module (e.g., the symmetric group of FIG. 4) may be moved backward or forward along the optical path or relative to the image sensor (e.g., via a controller module (e.g., 113) and a motor (e.g., 112)). This motion of the symmetrical lenses may change the focus distance as desired, but some astigmatism may be present at the new focus position due to one or more non-symmetrical optical lenses in the lens module. For example, at least one of the axes may be (e.g., slightly or partially) out of focus. To adjust (e.g., correct or update) the focus of the at least one axis, a non-symmetrical optical lens (or group of optical lenses) of the lens module may to be moved (e.g., with the symmetric group or separate from the symmetric group). This movement of the non-symmetrical optical lens may cancel the astigmatism along that axis and may allow both axes to focus at the same desired distance.

The non-symmetrical optical lens (or group) in a lens module may be close to the aperture stop as opposed to being close to the image sensor (e.g., the closest optical lens to the aperture stop, less than 5 mm from the aperture stop, or less than half of the total optical length of the lens module along the optical axis). If the non-symmetrical lens (or group) is close to the image sensor plane it may affect distortion but it won't introduce different magnifications in the different axes (e.g., x- and y-axes). If the non-symmetrical lens (or group) is at the aperture, then it may introduce different magnifications but not affect distortion. Thus, if the non-symmetrical lens (or group) is between these two, it may affect distortion and provide different magnifications. In some embodiments, the non-symmetric optical lens is a pupil lens, meaning it has the same or similar focusing effect on the center and in the corner/edge of the image (as opposed to a field lens which focuses differently at the center than in the corner/edge of the image). This typically means that the non-symmetric optical lens is close to the aperture stop (which is typically located at or near the entrance pupil) (e.g., the distance is less than one third of the total length of the lens module along the optical axis). In the example of FIG. 4, the non-symmetrical group is near the aperture stop (e.g., the distance from is less than one third of the total length of the lens module along the optical axis) so they work well for focusing and canceling astigmatism.

Figures 5A, 5B:
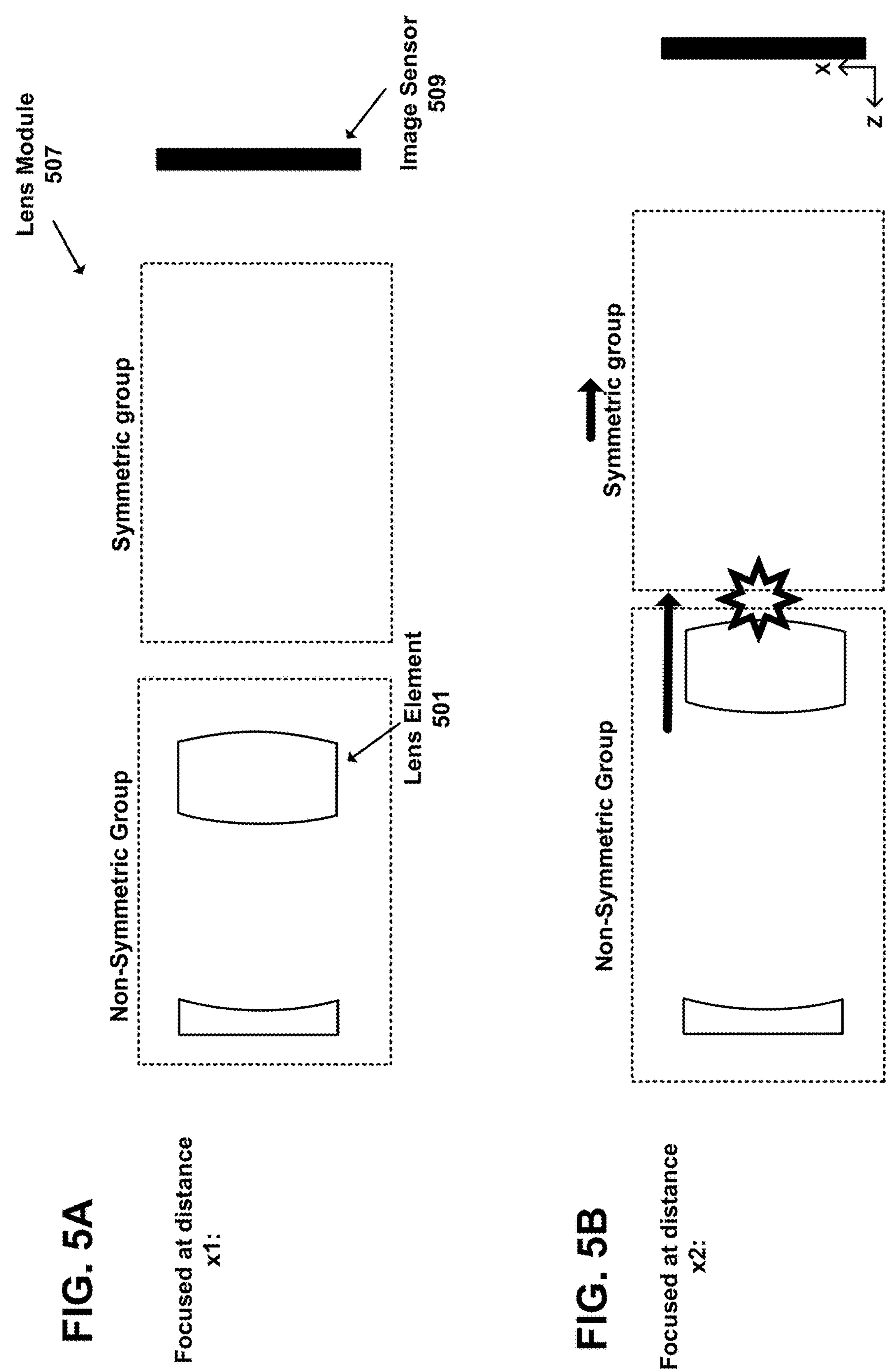
FIGS. 5A-5B illustrate a cross-section of another lens module with a symmetric group and a non-symmetric group, according to an embodiment.

When focusing light onto an image sensor, the amount of motion of the non-symmetrical optical lens (or group of optical lenses) is a function of the power of that optical lens. When the optical power of the non-symmetrical lens is low (e.g., less than 10 diopters), large motion may be required to adjust (e.g., correct) the focus. In some cases, the movement may be larger than what the imaging system can offer (e.g., desired movement of the non-symmetrical element would interfere mechanically with another optical lens). This is illustrated in FIGS. 5A-5B. FIG. 5A illustrates a cross-section of a lens module 507 and image sensor 509, where the lens module 507 includes a symmetric group and a non-symmetric group (optical lenses of the symmetric group are not illustrated). FIG. 5B is similar to FIG. 5A except the groups are moved to double the focus distance of the lens module 507. In this example, the symmetric group and a single optical lens 501 of the non-symmetric group move closer to the image sensor 509 to focus the lens module 507. However, in this specific example, to double the focus distance, optical lens 501 moves more than the symmetric group to focus the image onto the image sensor (e.g., so both x- and y-axes are focused at the sensing plane of the image sensor 509), resulting in optical lens 501 contacting an optical lens in the symmetric group.

Thus, to increase the focus distance of a lens module without optical lenses contacting each other, it may be desirable to reduce the amount of motion of the optical lenses in the lens module. Reducing motion of optical lenses may also reduce the focus time and power consumption of the imaging system. Additionally, large motion may negatively affect the optical performance or introduce undesired optical effects (e.g., vignetting).

(i) Lens Module with Power Optical lenses

To reduce motion of a non-symmetrical optical lens with optical power P>0 in an axis (e.g., the x- or y-axis), one solution is to replace the non-symmetrical optical lens with 2 or more non-symmetrical optical lenses that have a combined optical power of P in that axis. The non-symmetrical optical lenses with a combined power of P may be referred to as "power optical lenses." In this context, P is the power that may be used to achieve a desired focal length of the lens module in a dimension (e.g., in the x- or y-dimension). For example, P results in or contributes to the lens module having a different magnification along one of the axes (e.g., the x-axis). P may be derived from the desired 'squeezing' factor on one of the axes. In some embodiments, the desired squeezing is around 20-50%. In these embodiments, the power P may be in the range of 10-50 diopters. Although many different combinations of powers of the power optical lenses are possible (provided the combined power is P>0), having a power optical lens where the absolute value of that lens is larger than P results in reduced lens motion to focus the lens module (compared to a single non-symmetrical optical lens with optical power P). To do this with two power optical lenses, one element can have a positive optical power and the other can have a negative optical power, such that the combined power is P (the combination of positive and negative optical powers may also help to reduce or correct chromatic aberrations). For example, one power optical lens has a power of −nP and the other power optical lens has a power of +(n+1)P (where n is a real number greater than zero). So, in this example, the combined power of the two power lenses is P, where one power optical lens has a power that is strongly negative and the other may has a power that is slightly stronger but positive. That being said, the power relationships of the power optical lenses may be different than the example of −nP and +(n+1)P described above (e.g., if there are three or more power optical lenses). In another example, to achieve a lens module with a focal length of 20 mm along the x-axis and a focal length of 10 mm along the y-axis, the lens module can include symmetrical lenses that achieve a focal length of 20 mm in the x- and y-axes and two (or more) non-symmetrical lenses, where these non-symmetrical lenses have a combined optical power that satisfies a magnification of ½ times along the y-axis (thus doubling the field of view). Among other advantages, this lens module results in an expanded field of view along the y-axis that can be captured by an image sensor (e.g., that has a shorter dimension along the y-axis).

As mentioned above, one advantage of using power optical lenses (instead of the single non-symmetrical optical lens with power P), is that for focusing, one of these power optical lenses may be moved by a smaller amount (compared to the single non-symmetrical optical lens with power P). This may be because of the relatively high optical power that each power optical lens has (e.g., −nP or +(n+1)P). For example, for an optical lens with power 100 and a second optical lens of power −80 along an axis, a motor may move one of the elements by 0.5 mm or less to correct astigmatism at all distances along that axis.

(ii) Lens Module with Stationary and Moving Groups

In embodiments where a lens module includes power optical lenses, the lens module may include two (or more) moving groups to focus the imaging system. A first group serves as the main focusing group (e.g., it includes one or more symmetrical lenses, one or more non-symmetrical lenses, or a combination thereof). To change the focus distance, a motor (e.g., motor 112) may move this first group along the optical path (e.g., relative to the image sensor) so that one axis (e.g., the x-axis) is focused at the desired distance. A second group includes the first power optical lens with an optical power along the second axis and may also move along the optical path. The motor (or another motor) may move the second group so that the second axis (e.g., the y-axis) is focused at the desired distance. A third group includes the second power optical lens and may remain stationary relative to the image sensor (in this example, there are just two power optical lenses).

The positions of the first and second moving groups may have some dependency on each other. For example, when the first group is at position T1, the second group is at position S1 (the position of one group may be dependent on the position of the other group). For any combination of positions, Tn and Sn (where n is an integer), the lens module is focused at some distance and both axes are focused (e.g., properly) for that distance. These positions and their corresponding focusing distances may be known by the controller module (e.g., 113) so that it can provide appropriate adjustment instructions to one or more motors (e.g., 112) to focus the imaging system at a given distance.

Figures 6A, 6B:
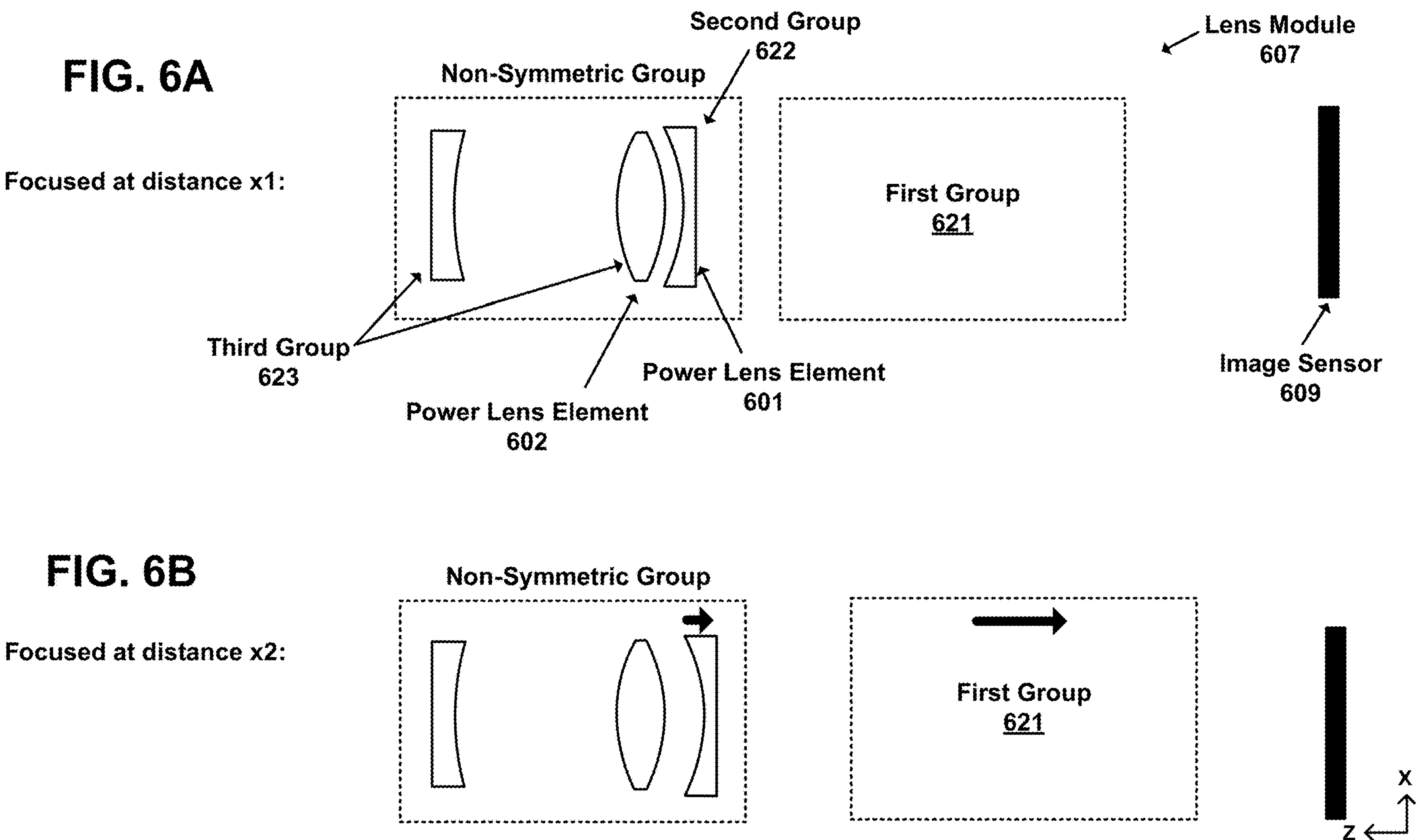
FIGS. 6A-6B illustrate a cross-section of another lens module, where the lens module includes a first group of symmetric optical lenses, a second group with a power optical lens, and a third group with a second power optical lens and another non-symmetrical optical lens, according to an embodiment.

FIGS. 6A-6B illustrate an example of a lens module 607 with three groups (two moving groups and one stationary group). Specifically, FIG. 6A illustrates a cross-section of a lens module 607 and image sensor 609, where the lens module 607 includes a first group 621 (e.g., of symmetric lenses (lenses not illustrated)), a second group 622 with power optical lens 601, and a third group 623 with (1) power optical lens 602 and (2) another non-symmetrical optical lens. Power optical lenses 601 and 602 may have a combined optical power of non-symmetrical lens 501 (in FIGS. 5A-5B). FIG. 6B is similar to FIG. 6A except groups 621 and 622 are moved closer to the image sensor 609 (e.g., by motors) to change focus distance of the lens module 607, while group three remains stationary. Among other advantages, since power optical lens 601 has a higher optical power than lens 501, power optical lens 601 in FIG. 6B moves less than optical lens 501 in FIG. 5B and thus does not contact an optical lens in the first group 621.

Other embodiments for achieving the same (or similar) outcome include a lens module with a single moving group to adjust the focus, thus reducing complexity of the imaging system. For example, only a single mechanism (e.g., motor) changes the focus. This may be achieved by coupling a power optical lens (e.g., 601) with the first group (e.g., 621). Thus, one of the power optical lenses moves with the first group (e.g., it is coupled to the same lens mount), while the other power optical lens (e.g., 602) remains stationary. In this case, the power of the power optical lens coupled to the first group may be selected such that the lens module focuses both axes (e.g., x- and y-axes) at the same distance for any focus position. To achieve this, for example, one may (1) determine what motion distance (e.g., in mm) may be used to focus a first dimension (e.g., the x-dimension) of a field of view and then, based on that, (2) design the powers of the power optical lenses such that (a) their combined power satisfies the lens design for the purpose of stretching (or condensing) the second dimension (e.g., the y-dimension) but also so that (b) the power of one of the power optical lenses is such that for any distance of object to correct astigmatism in the second dimension, the power optical lens uses the same motion distance (e.g., in mm) as the motion distance to focus the first dimension (e.g., the x-dimension).

More generally, first one may determine a focus range (e.g., 1 to 5 m) and focal length for each of the first and second axes (e.g., the x- and y-axes) of a lens module. For example, the desired lens module should have a y-axis focal length of 1.5 times the x-axis focal length. The desired focal lengths may be based on the desired focus range and dimensions of the imaging system (such as the dimensions of the image sensor and the amount of space available to move optical lenses to achieve the desired focus range). Next, (e.g., symmetric) optical lenses are determined (e.g., selected or designed) for a first group to achieve the desired focal length along the first axis (e.g., the x-axis). This may result in the second axis (e.g., the y-axis) having the same focal length as the first axis (e.g., since the optical lenses in the first group are symmetric). Since the focal length in the second axis should be different than the focal length in the first axis (e.g., 1.5 times), one or more non-symmetric optical lenses are determined to achieve the desired focal length along the second axis. (In this example, the non-symmetrical lenses only have optical powers along the second axis. In other example embodiments, the non-symmetrical lenses may also have optical powers along the first axis and the lenses in the first group may be determined to account for this). Thus, to change the focus of the lens module along the focus range (e.g., from 1 m to 5 m), the first group may be moved along the optical axis to adjust the focus along both axes and the non-symmetric group may also be moved to correct for any astigmatism along the second axis.

However, as previously described, depending on the focus range, the power of the lenses and the available movement of the optical lenses, it may be desirable to reduce the movement of one or more of the non-symmetrical optical lenses. To do this, as previously described, one of the non-symmetrical optical lenses with optical power P>0 along the second axis may be replaced with two or more power optical lenses (which are also non-symmetrical) that have a combined optical power of P along the second axis. While the combined optical power of the power optical lenses along the second axis should be P, there is a degree of freedom with the individual powers of the power optical lenses. This degree of freedom can be used to determine a power of one of the power optical lenses such that it can move the same distance as the first group to achieve the same focus change (e.g., the first group and one of the power optical lenses are both moved 5 mm to change the focus distance from 1 m to 5 m). Said differently, the powers of the power optical lenses may be selected based on the movement range of the first group (to achieve the desired focus range). More specifically, the power of each power optical lens is selected such that one of the power optical lenses can be moved with the symmetric group along the same movement range. In some embodiments, this may be achieved by allowing the powers to be variables during optimization and then constraining the motion range, thus making the system converge during optimization to some power of said lenses. Thus, if the first group moves by X mm and the power optical lens also moves by X mm to achieve same focusing action, both of these can be mechanically coupled to the same structure and moved together (e.g., using a single motor) to change the focus of the lens module (while keeping an astigmatism below a threshold value along the second axis).

Figures 7A, 7B:
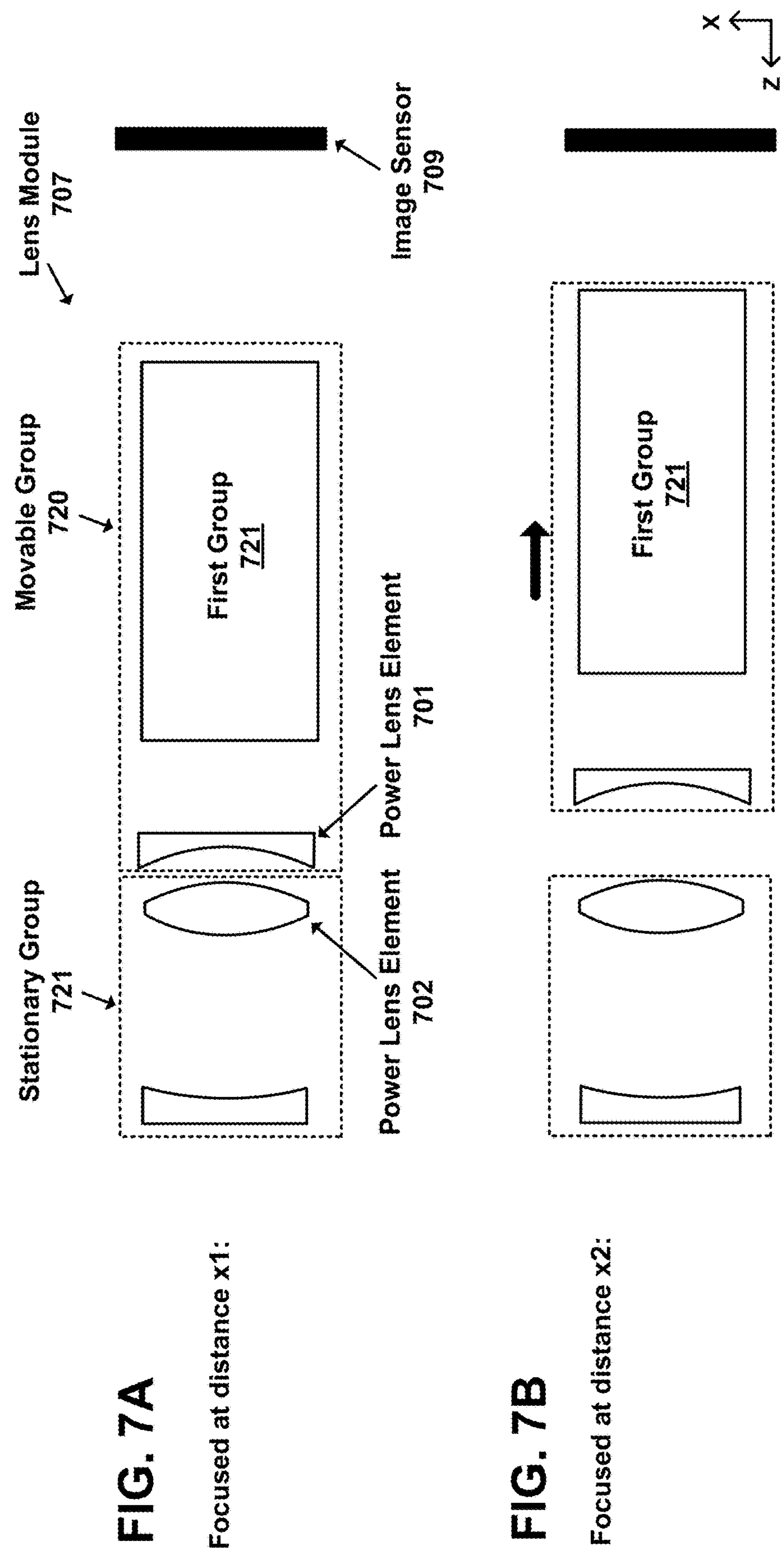
FIGS. 7A-7B illustrate a cross-section of another lens module, where the lens module includes a stationary group of lenses and a single movable group of lenses, according to an embodiment.

FIGS. 7A-7B illustrate an example embodiment where a power optical lens is part of the first group and moves with the lenses in the first group. Specifically, FIG. 7A illustrates a cross-section of a lens module 707 and image sensor 709, where the lens module 707 includes a movable group 720 and a stationary group 721 of optical lenses. The movable group 720 includes a first group of one or more (e.g., symmetric) optical lenses (individual optical lenses not illustrated) and power optical lens 701. As previously described, the first group may be configured such that both axes have the same focal length. Additionally, in some embodiments, the first group 721 includes non-symmetrical optical lenses configured to correct for optical aberrations (e.g., chromatic, higher order, spherical, and coma aberrations). The movable group 720 is configured to move along the optical axis (e.g., via a controller module and a motor), which is the z-axis in the example of FIG. 7A. For example, lenses of the movable group 720 are mechanically coupled to the same lens mount. The stationary group 721 is configured to remain stationary along the optical axis and includes a non-symmetric group including power optical lens 702. Power optical lens 702 corresponds to power optical lens 701. For example, the combined optical power of 701 and 702 along an axis is the same as the optical power of lens 501 along that same axis.

FIG. 7B is similar to FIG. 7A except the movable group 720 is moved to double the focus distance of the lens module 707 (after movement, both x- and y-axes focus at the same plane (e.g. the sensing plane of the image sensor)). Specifically, power optical lens 701 and the symmetric group move the same distance (e.g., within manufacturing standards or capabilities), because power optical lens 701 has a specific optical power designed so it moves the same amount. The various positions of the movable group 720 in the lens module 707 and the corresponding focusing distances may be known by the controller module (e.g., 113) so that it can provide appropriate adjustment instructions to the motor (e.g., 112) to focus the imaging system at a given distance.

(iii) Simulations

Figures 8A, 8B:
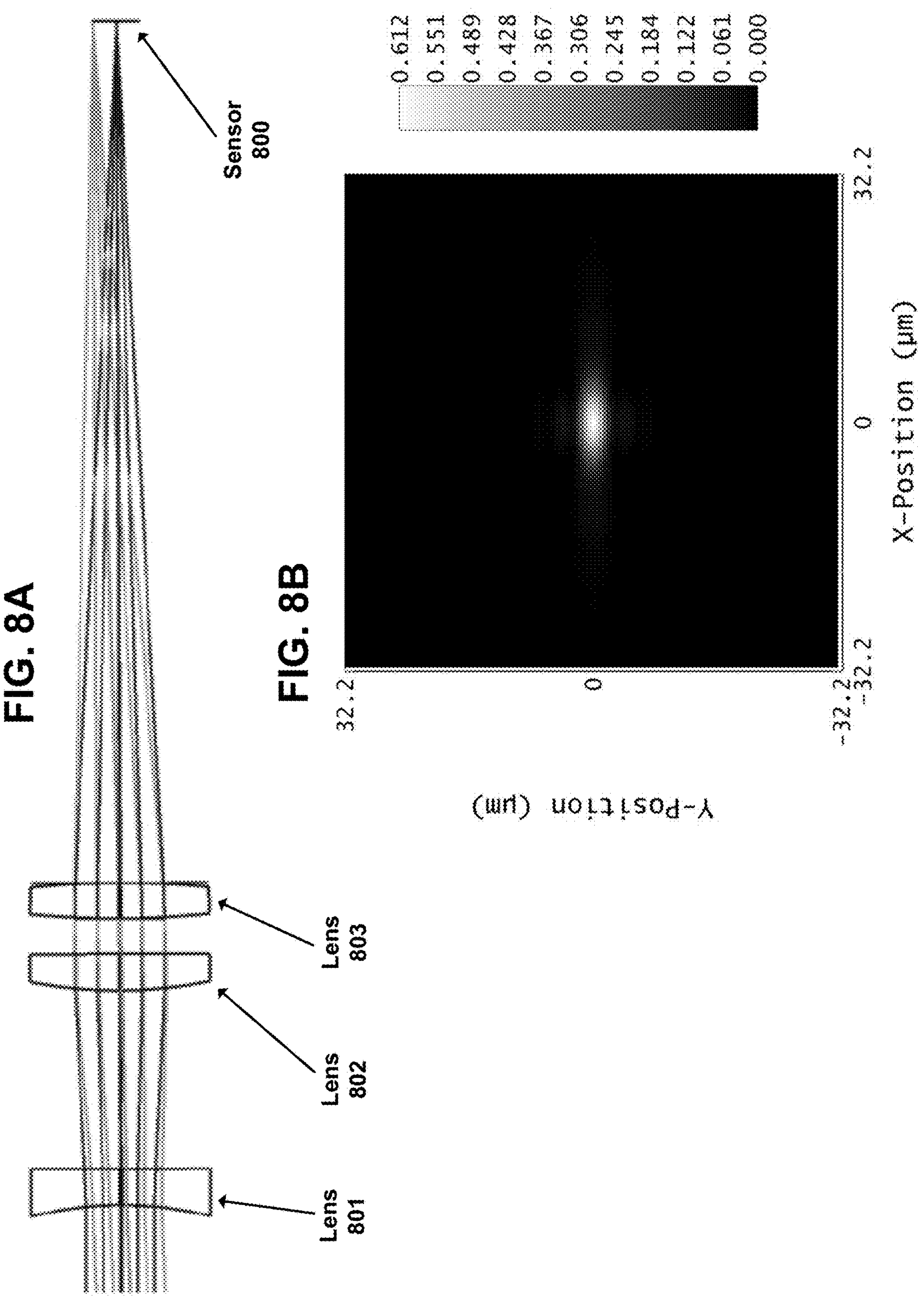
FIG. 8A illustrates a cross-section of a lens module without power optical lenses, according to an embodiment.
FIG. 8B is a graph of a point spread function of light at a sensor due to the lens module in FIG. 8A, according to an embodiment.

FIGS. 8A-9D are ray tracing simulations that demonstrate advantages of using power optical lenses. FIG. 8A illustrates a cross-section of a lens module without power optical lenses. The lens module includes lenses 801-803 and image sensor 800. Lens 803 is symmetrical and lenses 801 and 802 are cylindrical lenses (which are examples of non-symmetrical optical lenses). In the example of FIG. 8A, the lens module has a focal length of 48 mm in the horizontal direction and 32 mm in the vertical direction. Currently the lens module is focused at 5000 mm.

FIG. 8B is a graph of a point spread function of light at sensor 800 due to the lens module in FIG. 8A. Overall, the light is focused on a spot with little or no astigmatism. In this example, the point spread function is not circular because the lens module has an elliptical aperture of 10 mm and 5 mm (for the long and short axes of the ellipse). Among other advantages, having an elliptical aperture means that the F/#is different for each axis and more diffraction occurs in the direction that has a smaller aperture (higher F/#).

Figures 8C, 8D:
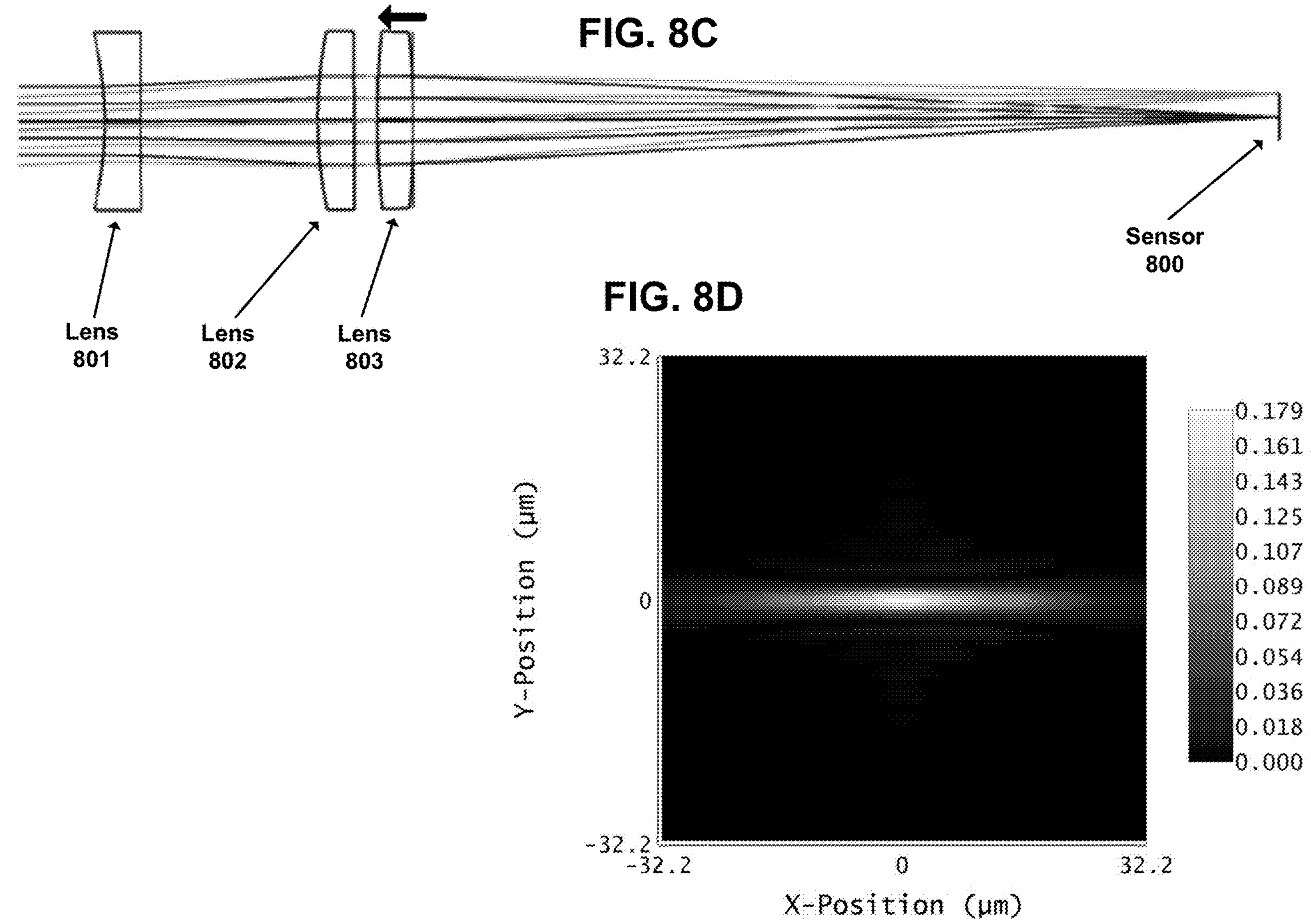
FIG. 8C illustrates the lens module of FIG. 8A, where one of the lenses is moved, according to an embodiment.
FIG. 8D is a graph of a point spread function of light at a sensor due to the lens module in FIG. 8C.

FIG. 8C is similar to FIG. 8A, except lens 803 is moved to by 1.12 mm to change the focus of the lens module from 5000 mm to 1500 mm (lenses 801 and 802 remain stationary). FIG. 8D is a graph of a point spread function of light at sensor 800 due to the lens module in FIG. 8C. As illustrated, the point spread function is in focus in the vertical dimension but extremely blurry in the horizontal dimension (in other words, there is an astigmatism in the horizontal dimension) due to non-symmetrical lenses 801 and 802 remaining stationary. The astigmatism can be corrected by moving lens 802, however the movement distance will be substantially different than the distance moved by lens 803 (e.g., larger than 1% different or resulting in separate motors for each lens) and the movement may result in lenses 802 and 803 contacting each other.

Figures 9A, 9B:
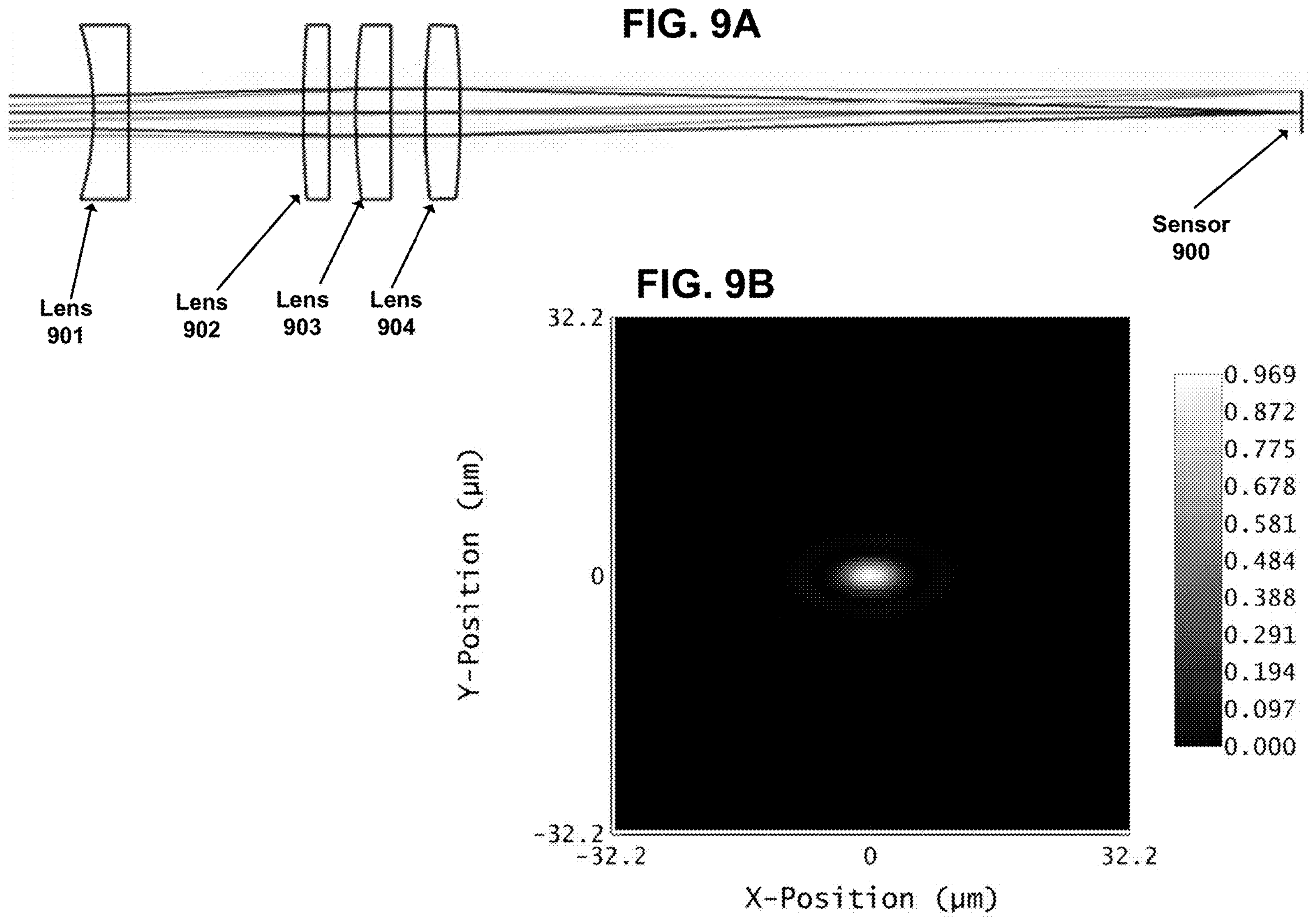
FIG. 9A illustrates a cross-section of a lens module with power optical lenses.
FIG. 9B is a graph of a point spread function of light at a sensor due to the lens module in FIG. 9A.

FIG. 9A illustrates a cross-section of a lens module including lenses 901-904 and image sensor 900. Lens 904 is symmetrical and lenses 901-903 are cylindrical lenses. In contrast to the lens module in FIG. 8A, the lens module in FIG. 9A includes power optical lenses. Specifically, lenses 902 and 903 are power optical lenses relative to lens 802 (the combined optical power of lenses 902 and 903 is the same as the optical power of lens 802). Similar to the lens module in FIG. 8A, the example lens module in FIG. 9A has a focal length of 48 mm in the horizontal direction and 32 mm in the vertical direction. Currently the lens module is focused at 5000 mm.

FIG. 9B is a graph of a point spread function of light at sensor 900 due to the lens module in FIG. 9A. Overall, the light is focused on a spot with little or no astigmatism. Similar to the description of FIG. 8B, the point spread function in FIG. 9B is not circular because the lens module has an elliptical aperture of 10 mm and 5 mm (for the long and short axes of the ellipse).

Figures 9C, 9D:
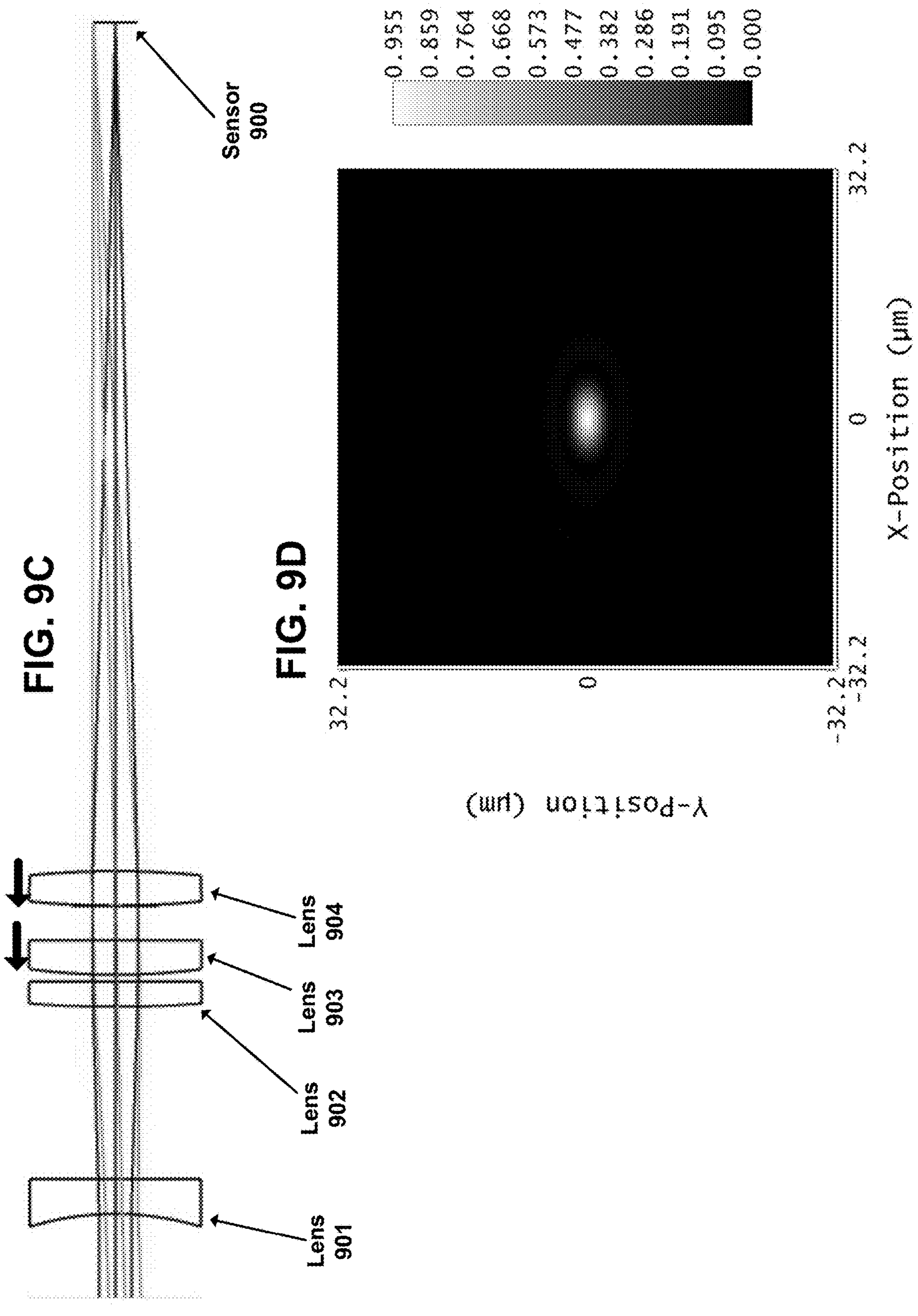
FIG. 9C illustrates the lens module of FIG. 9A, where two of the lenses are moved, according to an embodiment.
FIG. 9D is a graph of a point spread function of light at a sensor due to the lens module in FIG. 9C.

FIG. 9C is similar to FIG. 9A, except lenses 903 and 904 are each moved to by 1.12 mm to change the focus of the lens module from 5000 mm to 1500 mm (lenses 901 and 902 remain stationary). FIG. 9D is a graph of a point spread function of light at sensor 900 due to the lens module in FIG. 9C. As illustrated, the point spread function is in focus in the vertical dimension and in the horizontal direction. In other words, there is little or no astigmatism in the horizontal direction. This lack of astigmatism in the horizontal direction is due to non-symmetrical lens 903 having an optical power such that moving lens 903 by the same amount as symmetrical lens 904 results in lens 903 correcting any astigmatism resulting from movement of lens 904.

If some astigmatism is present at the focus position (e.g., due to imperfect manufacturing), it may be an astigmatism that degrades the MTF (modulus transfer function) by no more than a factor of two (e.g., one and a half) compared to the focus position without an astigmatism. The blur in either dimension shouldn't grow by a factor larger than two across the focusing range.

(iv) Lens Module with Field Lens

The following description describes lens modules with a field lens on or near an image sensor (e.g., the field lens is the closest optical lens to the image sensor along the optical axis). These lens modules may include one or more movable groups of optical lenses (as described above), or these lens modules may be separate from the lens modules describe above.

A field lens may be a type of non-symmetrical optical lens. Specifically, the field lens may have the same focal length in the x- and y-axes in a first portion of the lens (e.g., the center of the lens) but also have a non-symmetrical distortion behavior in a second portion of the lens (e.g., the portion surrounding the center portion) that allows squeezing a large field of view in one axis on the image sensor. The axis may align with a smaller side of the image sensor and may align with the smaller dimension of the non-symmetrical aperture. For example, the field lens produces a non-symmetrical distortion that squeezes a larger vertical field of view into a specific sensor height.

The field lens intentionally introduces strong distortion in the x- or y-direction so that a larger field of view can be captured by the sensor. Thus, for example, the field lens allows a sensor with an aspect ratio of 4:2 to capture a scene with an aspect ratio of 4:3. In some embodiments, the field lens distorts one dimension compared to the other by a factor of two or more to squeeze a dimension of a field of view into a specific sensor size.

As previously mentioned, the distortion introduced by the field lens may be non-symmetrical. Said differently, the distortion may stretch or condense an image along one axis (e.g., the x-axis) without distorting the image along another axis (e.g., the y-axis). Additionally, or alternatively, the distortion may grow with distance from a center point of the optical lens. For example, light from a scene passing through a center portion of the field lens may not be distorted. However, light from the scene passing through a portion outside of the center may be slightly distorted, and light from the scene passing through an edge portion of the field lens may be strongly distorted. Among other advantages, this type of field lens may provide more angular resolution in the center portion (since that portion doesn't have different magnifications along the axes).

Figure 10:
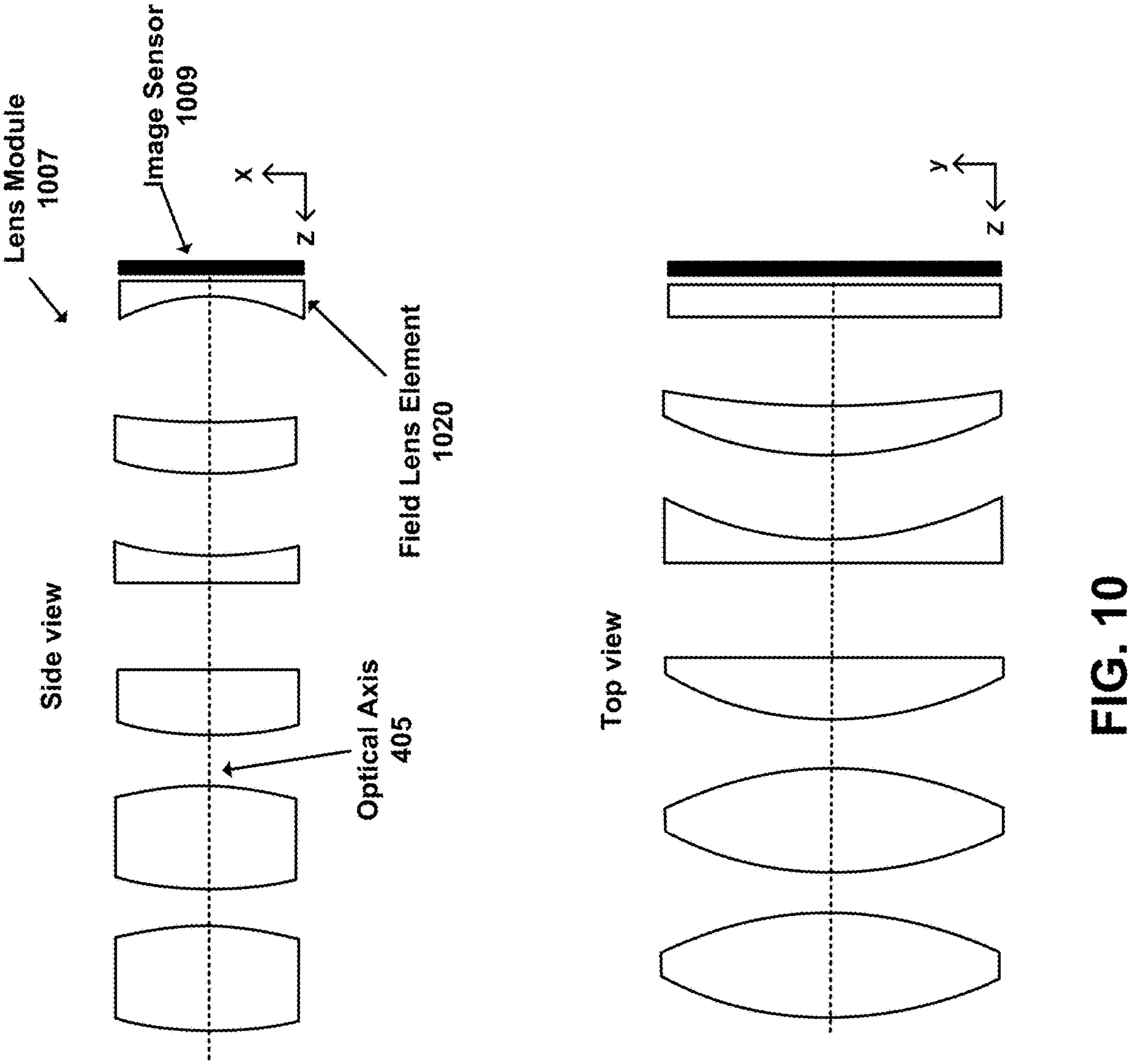
FIG. 10 illustrates a cross-section of a lens module with a field lens, according to an embodiment.
Figure 11:
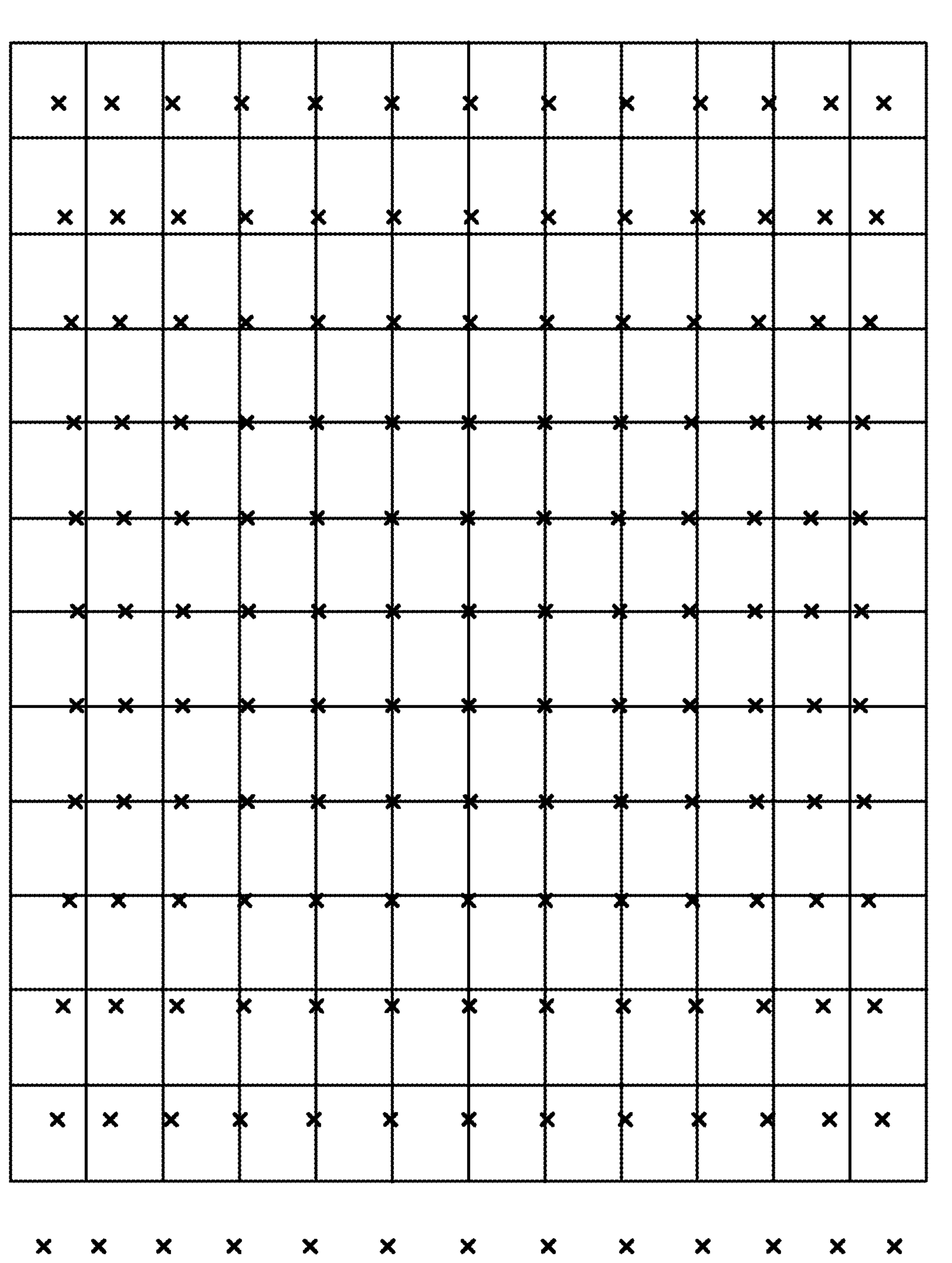
FIG. 11 illustrates an example "string" distortion of a field lens, according to an embodiment.

An example of a lens module 1007 with a field lens 1020 is illustrated in FIG. 10. FIG. 11 demonstrates an example "string" distortion of a field lens (e.g., 1020) in the vertical direction. The crosses show where rays from a specific field of view intersect the sensor after passing through the field lens. The black grid lines show where rays from the field of view would intersect the sensor after passing through an ideal distortion-free lens. Among other advantages, the distortion in FIG. 11 results in the image sensor capturing a larger vertical field of view (e.g., compared to a lens module without a field lens).

The non-symmetrical distortion of a field lens may be achieved by placing a cylindrical or anamorphic lens (or lens group) element on or close to the sensor (e.g., within 1 mm of the sensor. The said optical lens (or lens group) may stay static relative to the sensor during focusing. In some embodiments the field lens includes material with a high index of refraction (e.g., at least 1.9) to create the distortion. For example, the field lens includes one or more high index glass or crystal materials, such as Zinc Sulfide, Cleartran, or Zinc Selenide. In some embodiments, the field lens is located on top of the sensor and a 45 degree mirror is position between the said lens and the other optical lenses.

Although the lens modules described above with respect to FIGS. 3-11 are described in the context of imaging system 101, these lens modules can be applied to other types of imaging systems.

Example Machine Architecture

Figure 12:
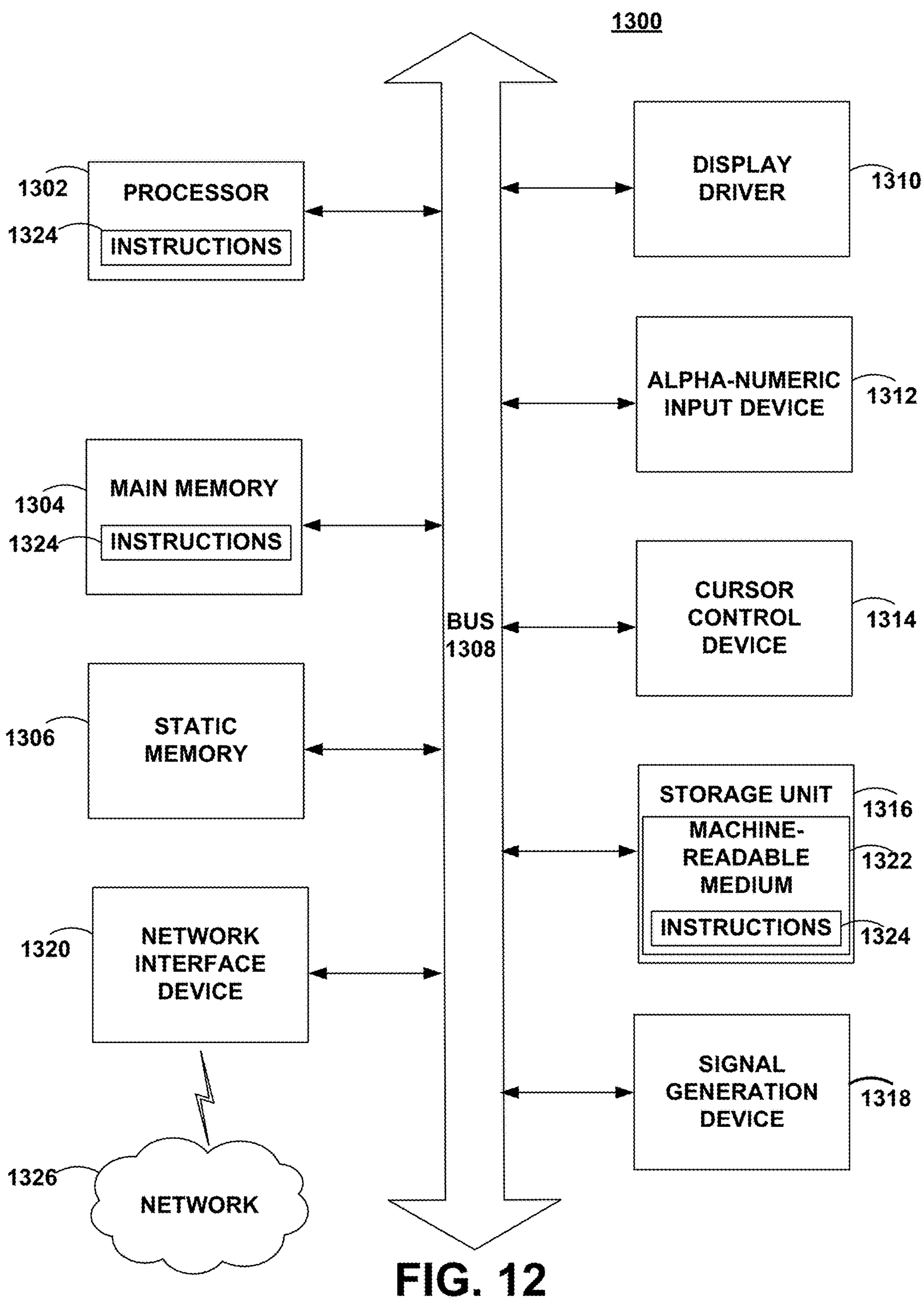
FIG. 12 is a block diagram illustrating components of an example machine able to read instructions from a machine-readable medium and execute them in a processor (or controller), according to an embodiment.

Referring now to FIG. 12, FIG. 12 is a block diagram illustrating components of an example machine able to read instructions from a machine-readable medium and execute them in a processor (or controller). Specifically, FIG. 12 shows a diagrammatic representation of the mobile device 103 in the example form of a computer system 1300. The computer system 1300 can be used to execute instructions 1324 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a standalone camera with processing components having a processor and a storage as described below. The machine also may be part of a system that includes a camera coupled with a server computer, a client computer, a personal computer (PC), a tablet PC, a set-top box (STB), a smartphone, an internet of things (IoT) appliance, or any machine capable of executing instructions 1324 (sequential or otherwise) that specify actions to be taken by that machine and that may be have a small volumetric area within which to incorporate an imaging system as described herein. Further, while only a single machine is illustrated, the term "machine" shall also be taken to include any collection of machines that individually or jointly execute instructions 1324 to perform any one or more of the methodologies discussed herein. The instructions may be, for example, instructions for controlling the imaging system components and/or image processing system described with respect to FIGS. 1-11.

The example computer system 1300 includes one or more processing units (generally processor 1302). The processor 1302 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 1300 also includes a main memory 1304. The computer system may include a storage unit 1316. The processor 1302, memory 1304 and the storage unit 1316 communicate via a bus 1308.

In addition, the computer system 10106 can include a static memory 1306, a display driver 1310 (e.g., to drive a plasma display panel (PDP), a liquid crystal display (LCD), or a projector). The computer system 1300 may also include alphanumeric input device 1312 (e.g., a keyboard), a cursor control device 1314 (e.g., a mouse, a trackball, a joystick, a motion sensor, or other pointing instrument), a signal generation device 1318 (e.g., a speaker), and a network interface device 1320, which also are configured to communicate via the bus 1308.

The storage unit 1316 includes a machine-readable medium 1322 on which is stored instructions 1324 (e.g., software) embodying any one or more of the methodologies or functions described herein. The instructions 1324 may also reside, completely or at least partially, within the main memory 1304 or within the processor 1302 (e.g., within a processor's cache memory) during execution thereof by the computer system 1300, the main memory 1304 and the processor 1302 also constituting machine-readable media. The instructions 1324 may be transmitted or received over a network 1326 via the network interface device 1320.

While machine-readable medium 1322 is shown in an example embodiment to be a single medium, the term "machine-readable medium" should be taken to include a single medium or multiple media (e.g., a centralized or distributed database, or associated caches and servers) able to store the instructions 1324. The term "machine-readable medium" shall also be taken to include any medium that is capable of storing instructions 1324 for execution by the machine and that cause the machine to perform any one or more of the methodologies disclosed herein. The term "machine-readable medium" includes, but not be limited to, data repositories in the form of solid-state memories, optical media, and magnetic media.

ADDITIONAL CONSIDERATIONS

The imaging system and associated algorithms described herein have several benefits over conventional cameras in terms of size, volume, shape, and performance. For example, among other advantages, the imaging system described herein may produce images with a larger resolution than conventional systems of comparable size.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, the controller module 113. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 1302, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment," "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for forming a combined image through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An imaging system comprising:

an image sensor in an xy-plane of a Cartesian coordinate system;

a lens module configured to direct light onto the image sensor, the lens module comprising:

a stationary group of optical lenses comprising a first set of non-symmetrical optical lenses; and a movable group of optical lenses comprising a symmetrical optical lens and a second set of non-symmetrical optical lenses; and a controller coupled to the movable group and configured to focus the imaging system over a focus range by generating an adjustment signal to move the movable group along an optical axis, the lens module focusing light on the image sensor along both the x- and y-axes of the image sensor and over the focus range, and the first and second sets of non-symmetrical optical lenses positioned to have an astigmatism below a threshold value over the focus range.

2. The imaging system of claim 1, wherein a combined optical power P of the first and second sets of non-symmetrical optical lenses along the x- or y-axis has a positive value.

3. The imaging system of claim 2, wherein one of the sets of non-symmetrical optical lenses has a combined optical power value that is negative along the x- or y-axis, and the other set of non-symmetrical optical lenses has a combined optical power value that is positive along the x- or y-axis.

4. The imaging system of claim 3, wherein one of the sets of non-symmetrical optical lenses has a combined optical power value of −nP and the other set of non-symmetrical optical lenses has a combined optical power value of +(n+1)P, where n is a real number greater than zero.

5. The imaging system of claim 1, wherein a combined optical power P of the first and second sets of non-symmetrical optical lenses along the x- or y-axis is 10-50 diopters.

6. The imaging system of claim 1, wherein the lens module has different magnifications along the x- and y-axes due to the first and second sets of non-symmetrical optical lenses.

7. The imaging system of claim 1, wherein the stationary group is configured to be stationary relative to the image sensor.

8. The imaging system of claim 1, wherein the lens module is configured to move the movable group along the z-axis.

9. The imaging system of claim 1, wherein at least one of:

the stationary group only includes the first non-symmetrical optical lens; or the stationary group doesn't include symmetrical optical lenses.

10. The imaging system of claim 1, wherein the movable group includes one or more additional non-symmetrical optical lenses configured to correct for optical aberrations.

11. The imaging system of claim 1, wherein the symmetrical optical lens is closer to the image sensor along the optical axis than the first and second sets of non-symmetrical optical lenses.

12. The imaging system of claim 1, wherein the movable group is closer to the image sensor along the optical axis than the stationary group.

13. The imaging system of claim 1, wherein a distance along the optical axis from the first set of non-symmetrical optical lenses to an aperture stop of the imaging system is less than half of a total length of the lens module along the optical axis.

14. The imaging system of claim 1, wherein at least one of:

the first set of non-symmetrical optical lenses includes two or more non-symmetrical optical lenses; or the second set of non-symmetrical optical lenses includes two or more non-symmetrical optical lenses.

15. The imaging system of claim 1, wherein at least one of:

the controller is configured to generate the adjustment signal to move optical lenses of the movable group together; or the controller is configured to generate the adjustment signal to move each optical lens of the movable group by substantially the same amount.

16. The imaging system of claim 1, wherein the controller is configured to generate the adjustment signal to move the symmetrical optical lens separately from the second set of non-symmetrical optical lenses.

17. The imaging system of claim 1, further comprising a non-symmetrical aperture with one larger axis and one smaller axis.

18. An imaging system comprising:

an image sensor;

a lens module configured to direct light onto the image sensor, the lens module having different magnifications along substantially orthogonal axes parallel to a sensing plane of the image sensor, the lens module comprising:

a first group of one or more optical lenses comprising a symmetrical optical lens;

a second group of one or more optical lenses comprising a first non-symmetrical optical lens with a first optical power along a first axis parallel to the sensing plane; and a third group of one or more optical lenses comprising a second non-symmetrical optical lens with a second optical power along a second axis parallel to the sensing plane; and a controller configured to generate an adjustment signal to focus an image onto the sensing plane of the image sensor by adjusting distances of the first group and the second group along an optical axis of the imaging system.

19. The imaging system of claim 18, wherein the controller is configured to generate the adjustment signal to move the first group and the second group by substantially the same amount to focus the image onto the sensing plane.

20. The imaging system of claim 18, wherein the controller is configured to generate the adjustment signal to move the first group and the second group by a substantially different amount to focus the image onto the sensing plane.

* * * * *